United States Patent
Hori et al.

(10) Patent No.: US 6,343,522 B1
(45) Date of Patent: Feb. 5, 2002

(54) GEAR MECHANISM AND WEBBING RETRACTOR

(75) Inventors: Seiji Hori; Tomonori Nagata; Seiji Nishide; Keisuke Imai; Akira Sumiyashiki; Keiichi Kato; Toshio Saito, all of Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/261,969

(22) Filed: Mar. 3, 1999

(30) Foreign Application Priority Data

Mar. 6, 1998 (JP) .......................... 10-055435
Jan. 18, 1999 (JP) .......................... 11-009020

(51) Int. Cl.⁷ ............................................. B60R 22/36
(52) U.S. Cl. ........................................ 74/422; 242/374
(58) Field of Search ............................. 74/422; 242/374

(56) References Cited

U.S. PATENT DOCUMENTS 2,771,782 A    11/1956  Darby
5,582,070 A *  12/1996  Dominguez .................. 74/411
5,699,976 A    12/1997  Hori
5,906,327 A *   5/1999  Chamings .................. 242/374

FOREIGN PATENT DOCUMENTS

| DE | 93 19 513 | 3/1994 |
| JP | 55-21696  | 5/1980 |
| JP | 2500192   | 3/1996 |

* cited by examiner

Primary Examiner—David Fenstermacher
(74) Attorney, Agent, or Firm—Nixon Peabody LLP; Thomas W. Cole

(57) ABSTRACT

A gear mechanism and webbing retractor having a compact size in which a pinion is prevented from being damaged when a large initial driving force is applied from a gear. When a sensor detects an emergent deceleration of a vehicle, a piston driving device is actuated so as to move a rack at its standby position in a direction to a pinion. When the rack is located at the standby position, a tooth face on a side near a front end, of a front end tooth thereof is in contact with a pressure receiving surface of the initially driving member. The rack is moved along a pitch line in the direction to the pinion so that the front end tooth presses the pressure receiving surface. As a result, the initially driving member converts the initial driving force from the rack to a rotation force thereby rotating the pinion in the taking-up direction.

14 Claims, 26 Drawing Sheets

F I G. 7
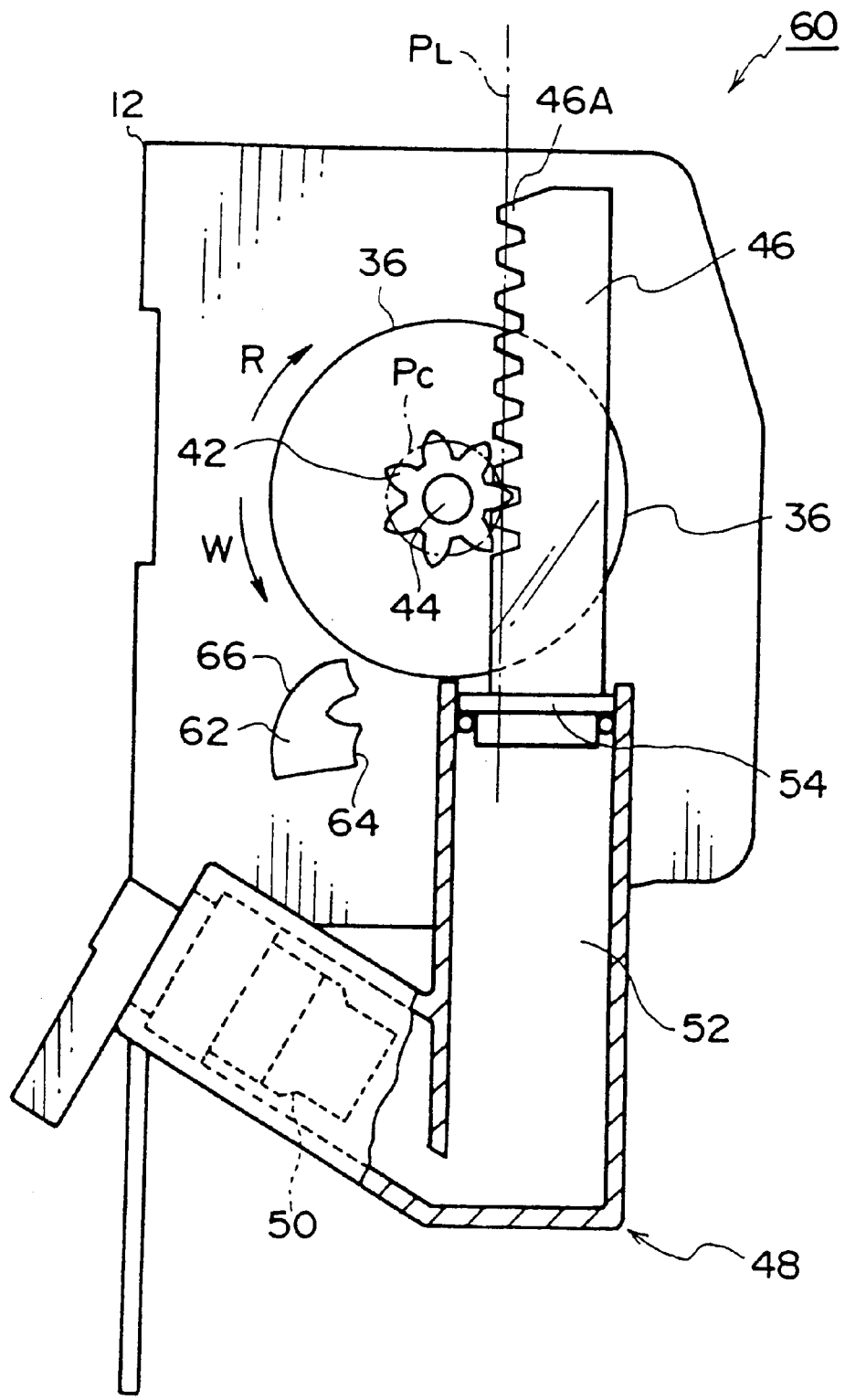

GEAR MECHANISM AND WEBBING RETRACTOR

BACKGROUND OF THE INVENTION

1. Field of the Invention

The present invention relates to a gear mechanism having a pinion and a rack, a large diameter gear meshing therewith and a webbing retractor for use in a seat belt system of a vehicle for taking out and taking up a webbing.

2. Description of the Related Art

Some types of the webbing retractor for use in the seat belt system contain a mechanism (pretensioner) for cancelling a slack of the webbing by taking up the webbing to tension it at the time of an emergent deceleration like a collision of the vehicle. Webbing retractors apparatus having such a pretensioner have been disclosed in for example, Japanese Utility Model Application Publication (JP-Y) No. 55-21696 and Japanese Patent No. 2500192.

The webbing retractor described in Japanese Utility Model Application Publication (JP-Y) No. 55-21696 comprises a drum to which an end portion of a seat belt (webbing) is fixed, a pinion fixed to a rotation shaft of this drum coaxially therewith, a piston supported slidably in a cylinder and a rack connected to a piston rod of this piston. Before the piston is actuated, the rack is held at a position in which it does not mesh with the pinion. Upon an emergency like a collision of a vehicle, gas is supplied into the cylinder by a gas generator and the piston is moved in a predetermined direction by this gas pressure. At the same time, the rack meshes with the pinion so as to rotate the pinion in a direction for taking up the seat belt. Therefore, according to the seat belt retractor described in Japanese Utility Model Application Publication (JP-Y) No. 55-21696, because the rack is held at a position in which it is not in mesh with the pinion before the piston is actuated, the pinion and the drum are capable of rotating without being interfered by the rack. Further, because the rack meshes with the pinion upon an emergency so as to rotate the pinion in the direction for drawing in the seat belt, the seat belt is wound up by the drum fixed to the pinion to cancel a slack of the seat belt.

The webbing retractor disclosed in Japanese Patent No. 2500192 comprises a belt drum for winding up a belt web (webbing), a pinion linked with this belt drum through a flywheel linking device and gear transmission means for transmitting only a rotation of a single direction, a rack meshing with this pinion and a piston cylinder driving unit in which a piston thereof is connected to the rack. Upon a collision of a vehicle, the piston cylinder driving unit is actuated by gas generated by a gas generator so as to move the rack. As a result, the pinion is rotated in the direction for taking up the belt web and the gear transmission means increases an angular velocity of the pinion and transmits the rotation of the pinion to the belt drum. Therefore, according to the belt retractor disclosed in Japanese Patent No. 2500192, because the gear transmission means increases the angular velocity of the pinion and transmits the rotation of the pinion to the belt drum, a taking-up amount for the belt web by the belt drum relative to a traveling amount of the rack can be made large.

However, in the webbing retractor described in Japanese Utility Model Application Publication (JP-Y) No. 55-21696, because upon an emergency, after the rack is moved from a position in which it is not in mesh with the pinion to a position in which it comes in mesh with the pinion, it rotates the pinion, when the rack meshes with the pinion, a large impact load is applied to the teeth of the pinion as an initial driving force. Therefore, in the webbing retrator having such a structure, the strength of the pinion teeth needs to be very high and therefore, it is difficult to reduce the size of the pinion. As a result, to secure a taking-up amount of the webbing necessary for an emergency time, the length of the rack and traveling range thereof need to be large, so that the retractor must be large-sized.

In the webbing retractor described in Japanese Patent No. 2500192, because the gear transmission means increases the angular velocity of the pinion, the traveling range of the rack can be reduced without reducing the number of the teeth of the pinion. However, since in the webbing retractor having such a structure, its gear transmission means is structured with at least two gears, the number of parts increases thereby leading to increases in production costs and weight.

SUMMARY OF THE INVENTION

Accordingly, the present invention has been achieved in views of the above described problems and therefore, an object of the invention is to provide a gear mechanism in which, even if a large initial driving force is applied from a gear to a pinion, teeth of the pinion are prevented from being damaged and a small-sized webbing retractor having the same gear mechanism.

According to a first aspect of the present invention, there is provided a gear mechanism comprising: a pinion; a gear meshing with said pinion; and an initial driving member provided on the pinion for receiving an initial driving force from the gear to rotate the pinion.

According to the gear mechanism having the above structure, at the same time when the gear in a stop state starts to drive the initial driving member, the initial driving member receives an initial driving force from the gear so as to rotate the pinion. As a result, the initial driving force is not applied from the gear directly to the teeth of the pinion or the initial driving force is applied indirectly to the teeth of the pinion. Thus, even when the initial driving force from the gear is large, the teeth of the pinion can be prevented from being damaged by the initial driving force.

The gear mentioned here refers to a gear having a larger diameter than the pinion, including a rack and a sector gear. In some case, the initial driving force is applied to the initial driving member in a condition that this gear is in mesh with the pinion, and in some case, the initial driving force is applied to the initial driving member from a position far from the pinion. The initial driving force mentioned here refers to a force which the gear applies to the pinion until the pinion is rotated by a predetermined rotation amount after the rotation of the pinion is started by the gear, and this initial driving force includes an impact force from the gear.

According to a second aspect of the present invention, there is provided a gear mechanism according to the first aspect, wherein the initial driving member is provided on the pinion coaxially therewith.

In the above described gear mechanism, the initial driving member can be supported by a shaft common to the pinion. Thus, any supporting shaft or bearing for supporting the initial driving member does not need to be added, thereby suppressing an increase of the number of parts.

According to a third aspect. of the present invention, there is provided a gear mechanism according to the first aspect, wherein the initial driving member supports a pressure receiving portion for receiving the initial driving force outwardly in a radius direction relative to the pinion.

In the gear mechanism having such a structure, in case where the direction of the initial driving force to be applied to the pressure receiving portion of the initial driving member by the gear is substantially parallel to a tangent line (pitch line) of a pitch circle on the pinion, the driving torque and angular velocity of the pinion can be changed by changing a distance from the pinion axis to the pressure receiving portion. Therefore, the driving torque and angular velocity of the pinion can be adjusted depending on the characteristic of the rotation load to be applied to the pinion at the initial phase of drive start.

According to a fourth aspect of the present invention, there is provided a gear mechanism according to the second and third aspects, wherein the gear or its supporting portion includes a recess for avoiding an interference with the initial driving member which rotates the pinion by receiving the initial driving force.

In the gear mechanism having the above described structure, the initial driving member which rotates the pinion by receiving the initial driving force is prevented from interfering with the gear or the supporting portion. Therefore, the pinion can be rotated continuously by the gear without releasing the initial driving member which rotates the pinion, from the pinion.

The gear supporting portion mentioned here refers to a member for supporting the gear movably in the driving direction and a member for transmitting a driving force to the gear, and includes, for example, a piston rod supporting a rack, gear rotation shaft and the like.

According to a fifth embodiment of the present invention, there is provided a gear mechanism according to the second and third aspects, wherein the initial driving member is fitted between teeth of the pinion detachably.

In the gear mechanism having the above described structure, since the initial driving member is fitted between the teeth of the pinion detachably, the initially driving member is capable of transmitting a torque securely to the pinion. Further, when the initial driving member receiving the initial driving force is released from the pinion, the initially driving member never interferes with the gear meshing with the pinion. Therefore, the pinion can be rotated continuously by the gear.

According to a sixth aspect of the present invention, there is provided a gear mechanism according to the fifth aspect further comprising a guide portion for allowing the initial driving member to rotate integrally with the pinion when the initial driving member engages the pinion to transmit the initial driving force to the pinion and for limiting a moving direction of the initial driving member for the initial driving member to be released from the pinion after the transmission of the initial driving force is completed.

In the gear mechanism having the above described structure, the guide portion for limiting the moving direction of the initial driving member makes the initial driving member to rotate integrally with the pinion when the initial driving force is transmitted to the pinion, and after the transmission of the initial driving force is completed, release the initial driving member from the pinion. As a result, the initial driving member can be prevented from falling out of the pinion during the transmission of the initial driving force. Thus, the initial driving force can be transmitted securely to the pinion through the initial driving member. Further, because the initial driving member does not interfere with the pinion and the gear after the transmission of the initial driving force is completed, the rotation of the pinion can be continued without being obstructed by the initial driving member.

According to a seventh aspect of the present invention, there is provided a gear mechanism according to the first aspect, wherein the initial driving member is supported swingingly around an axis different from that of the pinion while being fitted between teeth of the pinion detachably.

In the gear mechanism having the above described structure, because the initial driving member is fitted between the teeth of the pinion detachably, the initial driving member is capable of transmitting a torque to the pinion securely. After the initial driving member which has received the initial driving force is released from the pinion, the pinion can be rotated continuously by the gear because the initial driving member never interferes with the gear meshing with the pinion. Further, because the initial driving member is supported swingingly around a shaft disposed at a position different from the rotation shaft of the pinion, the initial driving member which has been released from the pinion can be held at a position in which it does not interfere with the pinion and the gear.

According to an eighth aspect of the present invention, there is provided a gear mechanism according to the secondseventh aspects, wherein a pressure receiving portion for receiving the initial driving force of the initial driving member is formed in an involute curve.

In the gear mechanism having the above described structure, as the pressure receiving portion of the initial driving member is formed in an involute curve, the torque and angular velocity of the pinion rotated by the initial driving member receiving the initial driving force can be substantially the same as the torque and angular velocity of the pinion rotating in mesh with the gear. Thus, the characteristics on the torque and angular velocity from a driving start of the gear mechanism to an end thereof can be made constant.

According to a ninth aspect of the present invention, there is provided a gear mechanism according to the first aspect, wherein the initial driving member is provided on the pinion so as to rotate integrally with the pinion while having an engagement portion outside a pitch circle of the pinion and, the gear comprises a driving force transmitting member engaging the engagement portion to transmit an initial driving force to the initial driving member, the driving force transmitting member being released from the engagement portion after the transmission of the initial driving force is completed.

In the gear mechanism having the above described structure, as the driving force transmitting member engages the engagement portion so as to transmit the initial driving force to the initial driving member, by changing the distance from the pinion axis to the engagement portion, the driving torque and angular velocity of the pinion to which the initial driving force is transmitted through the driving force transmitting member and the initial driving member can be changed. Thus, the driving torque and the angular velocity of the pinion can be adjusted depending on the characteristic of the rotation load to be applied to the pinion at the initial phase of the driving start. Further, be cause the driving force transmitting member is released from the engagement portion after the transmission of the initial driving force is completed, the driving force transmitting member never interfere with the initial driving member and the pinion after the transmission of the initial driving force is completed. As a result, the rotation of the pinion can be continued without being obstructed by the initial driving member.

According to a tenth aspect of the present invention, there is provided a gear mechanism according to the first ninth aspects, wherein the gear is a rack supported movably in the direction of a pitch line of the pinion.

In the gear mechanism having the above described structure, since the gear is a rack supported movably in the direction of the pitch line, when the rack is moved linearly along the pitch line, the linear movement of the rack can be converted to the rotation movement by the pinion. Thus, the pinion can be rotated by a driving force from a driving unit like a piston for generating a linear motion for the rack.

According to an eleventh aspect of the present invention, there is provided a gear mechanism comprising: a pinion; a gear meshing with the pinion; and a reinforcement member provided on the pinion for reinforcing teeth of the pinion for receiving an initial driving force from the gear.

In the gear mechanism having the above described structure, because the reinforcement member reinforces the teeth of the pinion for receiving the initial driving force from the gear, when the initial driving force from the gear is large, the teeth of the pinion can be prevented from being damaged by the initial driving force. Therefore, a sufficient rotation amount of the pinion can be secured even when the size of the pinion is reduced.

According to a twelfth aspect of the present invention, there is provided a gear mechanism comprising: a pinion; a pair of intermediate gears meshing with different teeth of the pinion, respectively; and a drive gear in which different teeth thereof are brought in mesh with the pair of the intermediate gears so as to transmit a driving force through the pair of the intermediate gears to rotate the pinion.

In the gear mechanism having the above described structure, because at the same time when the driving gear in a stop state starts to drive the pair of the intermediate gears, the driving force is distributed by the pair of the intermediate gears and transmitted to the pinion, as compared to the case in which no intermediate gears are provided, the maximum driving force to be applied to one tooth of the pinion can be reduced to substantially half. Thus, even when the initial driving force from the gear is so large that the load on the pinion becomes maximum, the teeth of the pinion can be prevented from being damaged by the initial driving force.

According to a thirteenth aspect of the present invention, there is provided a gear mechanism comprising: a pinion in which a module of a tooth is integer times the module of the other teeth and the one tooth is a beginning end tooth for receiving an initial driving force; and a drive gear in which a large tooth to mesh with the beginning end tooth of the pinion for transmitting the initial driving force and small teeth to mesh with the remaining teeth of the pinion for transmitting a driving force are provided continuously.

In the gear mechanism having the above described structure, because the module of the beginning end tooth of the pinion is integer times that of the remaining teeth, the tooth width of the beginning end tooth is larger than that of the remaining teeth in the circumferential direction. Therefore, the strength of the beginning end tooth can be largely improved than the other teeth. As a result, even when the initial driving force from the driving gear is large, the pinion can be prevented from being damaged by the initial driving force.

According to a fourteenth embodiment of the present invention, there is provided a webbing retractor for tensioning a vehicle occupant restraining webbing in a direction for restraining the vehicle occupant upon an emergent deceleration of a vehicle, comprising: a gear mechanism according to the first-thirteenth aspects; a take-up shaft to which an end portion of the webbing is fixed; a clutch mechanism linked with the take-up shaft and the pinion of the gear mechanism for transmitting a torque from the pinion to only the taking shaft; and a drive means for driving the gear of the gear mechanism upon an emergent deceleration of the vehicle to rotate the pinion in the direction for taking up the webbing.

In the webbing retractor having the above described structure, the size of the pinion in the gear mechanism can be reduced without changing the material or the like. Therefore, a winding amount of the webbing necessary for an emergent deceleration of a vehicle is secured and the size of the gear in a rack or the like meshing with the pinion can be reduced. As a result, the size of the webbing retractor can be reduced without increasing manufacturing costs and weight of the retractor.

According to a fifteenth aspect of the present invention, there is provided a webbing retractor for tensioning a vehicle occupant restraining webbing in a direction for restraining the vehicle occupant upon an emergent deceleration of a vehicle, comprising: a pinion; an internal tooth gear in which internal teeth are formed along a driving side pitch circle having a larger diameter than a driven side pitch circle of the pinion, the internal teeth being brought into engagement with the teeth of the pinion at a meshing ratio of 2 or higher; a take-up shaft to which an end portion of the webbing is fixed; a clutch mechanism linked with the take-up shaft and the pinion of the gear mechanism for transmitting a torque from the pinion to only the take-up shaft; and a drive means for rotating the pinion in the direction for taking up the webbing by moving the internal tooth gear along the driving side pitch circle upon an emergent deceleration of a vehicle.

In the webbing retractor having the above described structure, because the internal teeth of the internal tooth gear mesh with the teeth of the pinion at a meshing ratio of 2 or higher and the internal tooth gear transmits the driving force from the driving means to the pinion. Thus, as compared to a case in which the driving force is transmitted by a set of gear and pinion whose meshing ratio is from 1 to slightly larger than 1, the maximum load to be applied to one tooth of the pinion can be reduced to below half, so that the driving force which can be transmitted between the internal tooth gear and the pinion can be largely increased. Thus, the teeth of the pinion can be prevented from being damaged by the initial driving force even when the size of the pinion is reduced without changing the material or the like. As a result, the taking-up amount of the webbing necessary for an emergent deceleration of a vehicle can be secured and the size of the webbing retractor can be reduced without increasing the manufacturing cost and weight of the retractor.

BRIEF DESCRIPTION OF THE DRAWINGS

FIG. 7 is a plan view showing a state in which the piston driving device of the webbing retractor according to the second embodiment of the present invention completes its action.

DESCRIPTION OF THE PREFERRED EMBODIMENTS

Embodiments of the present invention will be described with reference to the accompanying drawings.

First Embodiment

Figure 1:
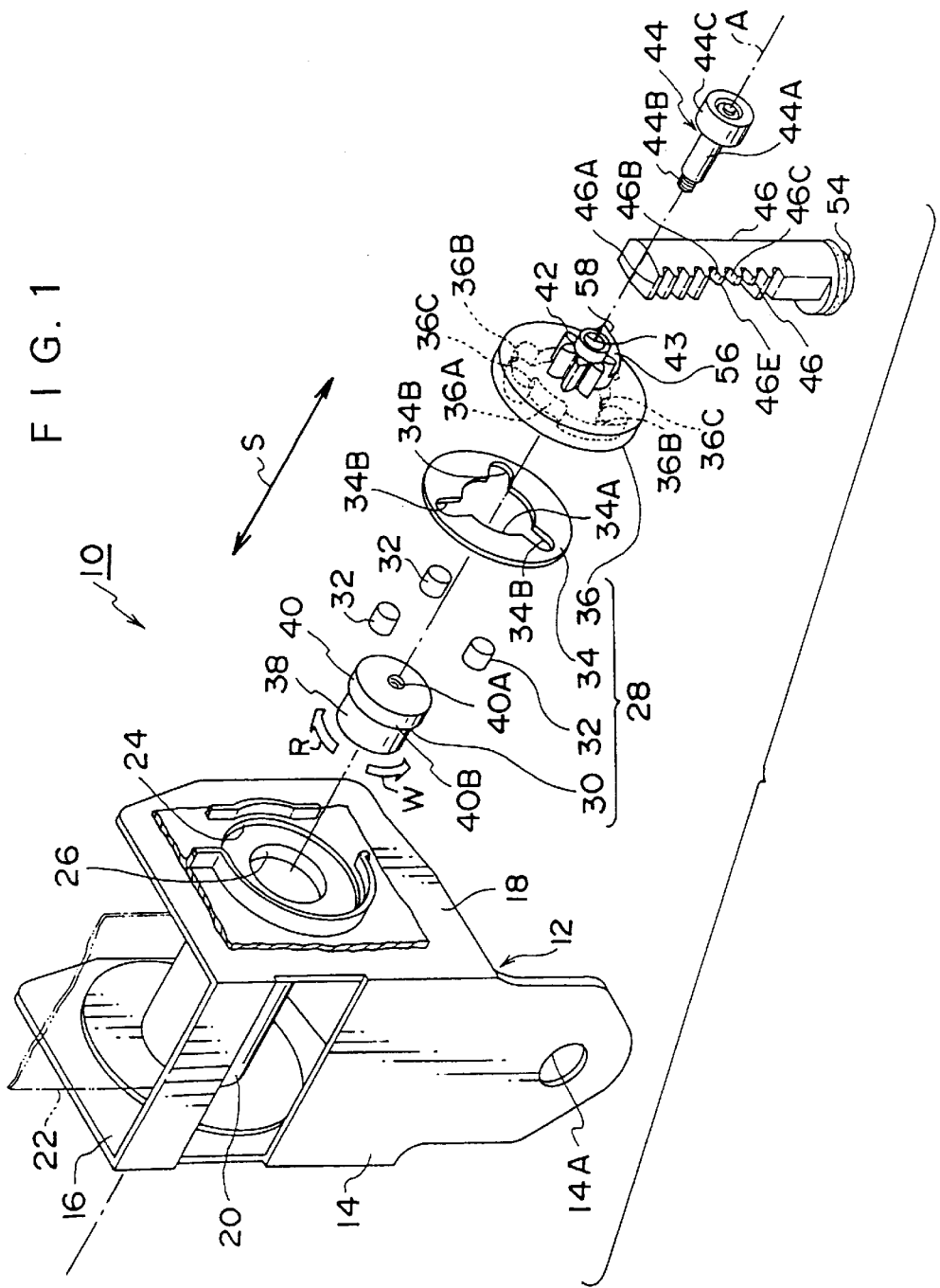
FIG. 1 is a disassembly perspective view showing a structure of a webbing retractor according to a first embodiment of the present invention.
Figure 2:
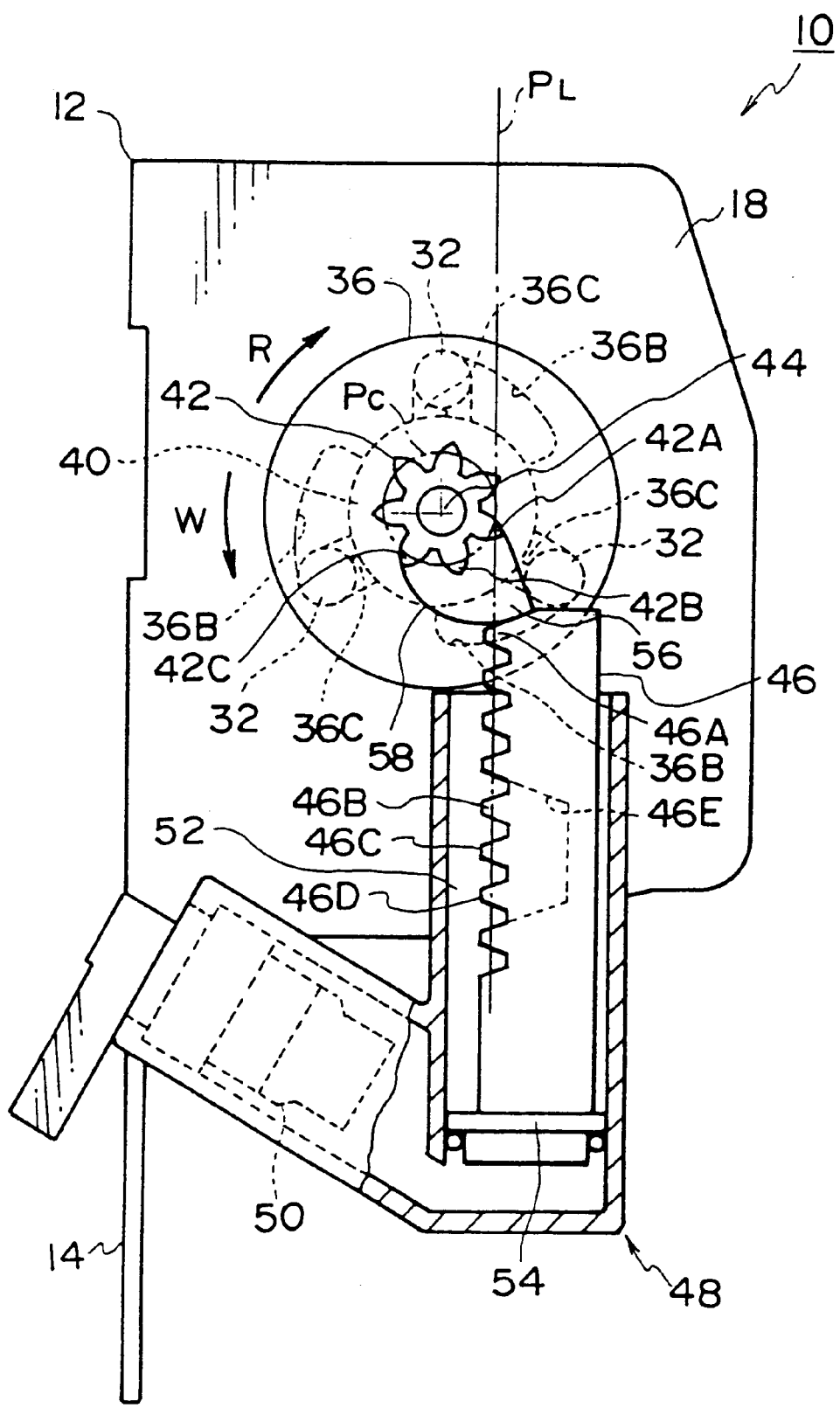
FIG. 2 is a plan view showing a state before a piston driving device of the webbing retractor according to the first embodiment of the present invention is actuated.
Figure 3:
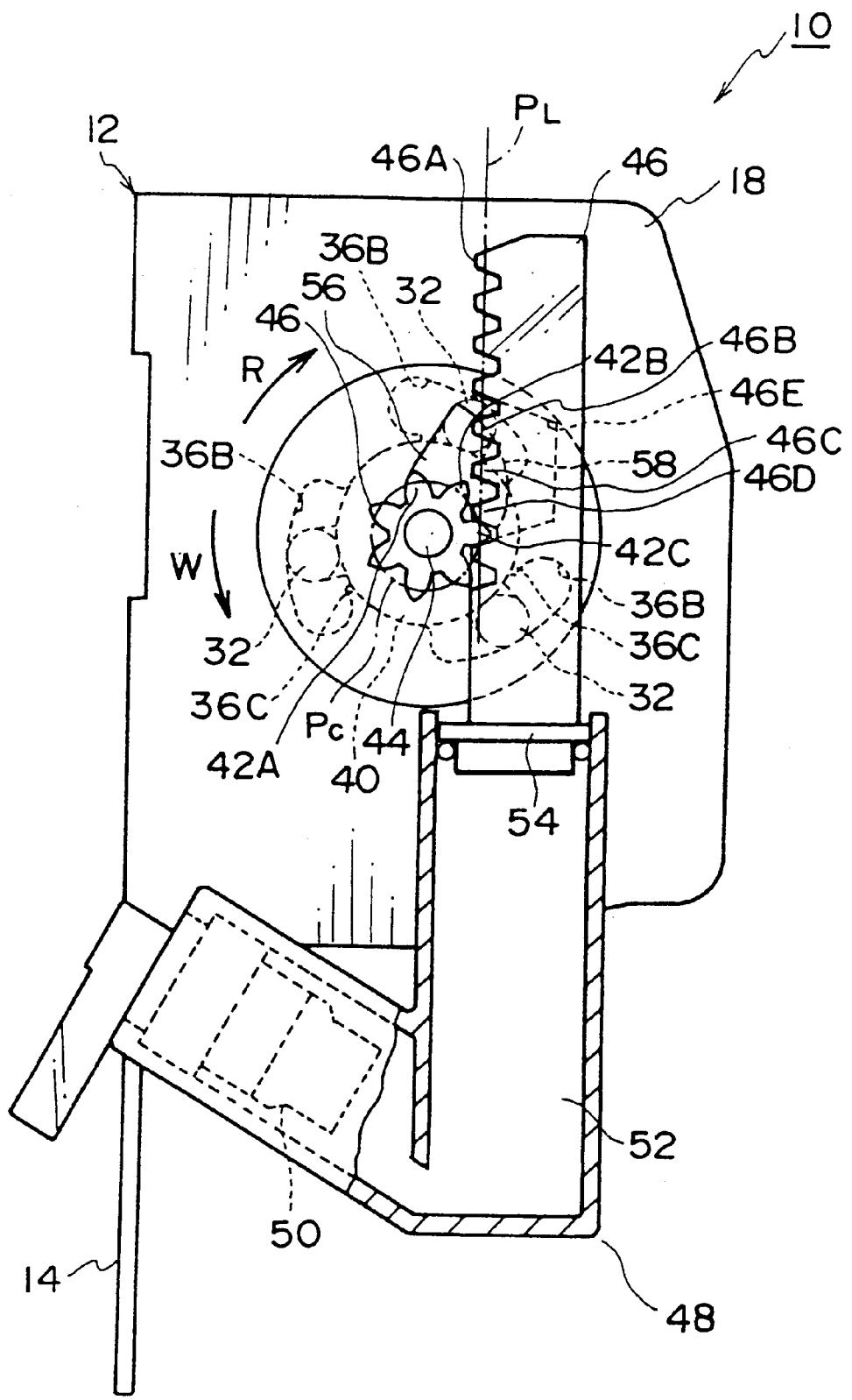
FIG. 3 is a plan view showing a state before a piston driving device of the webbing retractor according to the first embodiment of the present invention is actuated.

FIGS. 1 to 3 show a webbing retractor according to a first embodiment of the present invention. The webbing retractor 10 shown in FIG. 1 includes a frame 12 to be fixed to a vehicle body. This frame 12 comprises a plate 14 having a through hole 14A through which a bolt or the like is to be inserted to be fixed to a vehicle body and a pair of side plates 16, 18 which are bent at right angle from both sides of the plate 14 and parallel to each other. The frame 12 supports a spool 20 rotatably through the side plates 16, 18 and an end of a webbing 22 for restraining a vehicle occupant is fixed to this spool 20. In one side plate 18, a circular opening 24 is formed around an axis A of the spool 20 and a side face of the spool 20 corresponding to this circular opening 24 has an insertion hole 26 formed around the axis A.

A one-way clutch 28 is disposed outside one side plate 18 of the frame 12 such that it is coaxially coupled with the spool 20. This one-way clutch 28, as shown in FIG. 1, comprises a torque transmission shaft 30, cylindrical rollers 32, a holding plate 34 and a rotor 36. The torque transmission shaft 30 is constituted of an insertion portion 38 and a rotary coupling portion 40, both being formed in a cylindrical shape and having different diameters, and the insertion portion 38 and the rotary coupling portion 40 are coaxial with each other in a direction parallel to the axis A (axial direction S). Spline teeth (not shown) parallel to the axis A are formed on an outer circumference of the insertion portion 38 and grooves (not shown) corresponding to the spline teeth of the insertion portion 38 are formed on an inner periphery of the insertion hole 26, and then the insertion portion 38 is fitted into the insertion hole 26. As a result, the torque transmission shaft 30 is fixed to the spool 20. In the rotary coupling portion 40, a screw hole 40A extending along the axis A is formed on an outside face relative to the axial direction S.

The holding plate 34 of the one-way clutch 28 is formed in a thin circular plate and a circular opening portion 34A through which the rotary coupling portion 40 is to be inserted is formed in the center thereof. U-shaped roller holding portions 34B are formed by cutting from this opening portion 34A outward in the radius direction. Three roller holding portions 34B are provided at equal intervals (every 120°) around the axis A. The holding plate 34 is disposed between an outer pheriphery of the rotary coupling portion 40 and an inner face of the circular opening 24 and is held on an outside side face of the spool 20 along the axial directions. The three rollers 32 are disposed in the roller holding portions 34B of the holding plate 34, respectively. These rollers 32 are positioned in a circumferential direction by the roller holding portion 34B and disposed slidably or rotatably on the outer pheriphery of the rotary coupling portion 40.

The rotor 36 of the one-way clutch 28 is formed in a disc shape having a larger thickness than those of the roller 32 and the rotary coupling portion 40, as shown in FIG. 1. In the rotor 36, a shaft accommodating portion 36A and roller accommodating portions 36B communicating with the shaft accommodating portion 36A are formed on an inner side face thereof opposing the spool 20. The shaft accommodating portion 36A and the roller accommodating portions 36B are formed in concave shape with respect to the inner side face thereof, and each of them has a depth corresponding to the rotary coupling portion 40 and the roller 32, respectively. The shaft accommodating portion 36A is formed in a substantially circular shape around the axis A. The roller accommodating portions 36B extend from an inner peripheral face of the shaft accommodating portion 36A outward in the radius direction and totally three roller accommodating portions 36B are disposed at equal intervals (every 120°) around the axis A. Each roller accommodating portion 36B is formed in a substantially oval shape extending in the spiral direction around the axis A. An engaging protrusion 36C is projected between the outside end portion of each roller accommodating portion 36B in the spiral direction and the shaft accommodating portion 36A along the inner peripheral face of the shaft accommodating portion 36A. As shown in FIG. 1, a pinion 42 is provided on an outside face of the rotor 36 in the axial direction S coaxially therewith. A through hole 43 is formed in this pinion 42 along the axis A communicating with the shaft accommodating portion 36A.

The rotor 36 is disposed on an outer side face of the side plate 18 and while holding the holding plate 34, accommodates the rotary coupling portion 40 of the torque transmission shaft 30 within the shaft accommodating portion 36A. At the same time, the rotor 36 accommodates the rollers 32 within the roller accommodating portion 36B. The rotor 36 is connected to the torque transmission shaft 30 through a coupling member 44. As shown in FIG. 1, in the connecting member 44 a male screw portion 44C is formed at an end of a round bar like shaft portion 44A and a head portion 44C is formed at a rear end of the shaft portion 44A. As for the coupling member 44, the shaft portion 44A is inserted through the through hole 43 of the pinion 42 and then the male screw portion 44B is screwed into the screw hole 40A of the rotary coupling portion 40. As a result, the coupling member 44 supports the rotor 36 and pinion 42 rotatably, and the rotor 36 is prevented from moving on the torque transmission shaft 30 in the axial direction S. At this time, the holding plate 34 is supported rotatably relative to the rotor 36.

The one-way clutch 28 having such a structure is assembled to a vehicle in a condition that it does not transmit torque to the spool 20, namely it is in the OFF state in which it is not in contact with the spool 20. In this OFF state, as shown in FIG. 2, relative positions of the holding plate 34 and rotor 36 are adjusted such that each of the rollers 32 is maintained within an end portion on the outside periphery of the roller accommodating portion 36B. At this time, the engaging protrusion 36C of the roller accommodating portion 36B catches the roller 32 and holds it at an off position apart from the outer peripheral face 40B of the rotary coupling portion 40. As a result, the spool 20 is capable of rotating in both ways, that is, taking-up direction W and taking-out direction R of the webbing 22 without an interference by the one-way clutch 28. A cover (not shown) for covering the one-way clutch 28 and the pinion 42 is mounted on the side plate 18. This cover member blocks a movement of the one-way clutch 28 in the axial direction S so as to prevent the insertion portion 38 of the torque transmission shaft 30 from falling out of the insertion hole 26.

On the other hand, as shown in FIG. 2, a rack 46 which meshes with the pinion 42 and a piston driving device 48 supporting the rack 46 movably in a linear direction are disposed on the side plate 18 of the frame 12. This piston driving device 48 includes a gas generator 50, a piston cylinder 52 to be supplied with a high pressure gas generated by the gas generator 50 and a piston 54 disposed within the piston cylinder 52. The piston 54 is supported slidably along an inside wall of the piston cylinder 52 and forms a variable volume air chamber sealed from outside together with the piston cylinder 52. A rear end of the rack 46 is fixed to a surface of air releasing side opposite to the air chamber of the piston 54. When the piston driving device 48 is assembled to the vehicle, the piston 54 is held at a position in which the air chamber volume formed in the piston cylinder 52 is minimized as shown in FIG. 2. At this time, the rack 44 fixed to the piston 54 is held at a predetermined standby position apart from the pinion 42 as shown in FIG. 2. The rack 46 held at the standby position is supported such that the pitch line $P_L$ contacts the pitch circle PC of the pinion 42.

The gas generator 50 of the piston driving device 48 is connected to an ignition power supply (not shown), and when an emergent deceleration detecting sensor (not shown) including an acceleration sensor detects an emergent deceleration of a vehicle due to a collision or the like, the ignition power supply is activated to supply an ignition current to the gas generator 50. When supplied with this ignition current, the gas generator 50 generates a high pressure gas and supplies it into the piston cylinder 52. As a result, the piston 54 is moved by this high pressure gas in a direction to expand the volume of the air chamber in the piston cylinder 52, so that the rack 46 located at the standby position is moved linearly in a direction toward the pinion 42 along the pitch line $P_L$.

As shown in FIG. 1, the pinion 42 has an initial driving member 56 extending from an outer periphery thereof outward in the radius direction, disposed coaxially with the pinion 42. The initial driving member 56 is formed in a smaller thickness than that of the tooth of the pinion 42 with respect to the axial direction S and disposed so as to be in contact with the outside side face of the rotor 36. Further, the initial driving member 56 extends outward in the radius direction from three teeth 42A, 42B, 42C which are continuous teeth of the pinion 42 as shown in FIG. 2. Here, the pinion 42 is positioned at a predetermined initial position in the rotation direction when it is assembled to a vehicle and held at the initial position, for example, with a shearing pin (not shown) made of resin inserted through the rotor 36 and side plate 18. The pinion 42 held at this initial position supports the initial driving member 56 at a position of a initial end tooth 46A of the rack 46 such that the initial driving member 56 is in contact with a tooth surface thereof. In the initial driving member 56, a pressure receiving face 58 thereof in contact with the rack 46 is formed in an involute curve common to the pinion 42. This pressure receiving surface 58 forms a smooth involute curve together with a tooth face of one side of a tooth 42C as shown in FIG. 2.

On the other hand, in the rack 46, as shown in FIG. 2, the tooth width of the teeth 46B, 46C, 46D to mesh with the three teeth 42A, 42B, 42C of the pinion 42 is formed smaller than the tooth width of the other teeth. In the rack 46, the outside side faces of the teeth 46B, 46C, 46D in the axial direction S are formed so as to meet the outside side face of the other teeth. Therefore, a concave recess 46E is formed at a portion facing the side plate 18 in the rack 46, corresponding to the teeth 46B, 46C, 46D.

Next, an operation of the webbing retractor according to the first embodiment having such a structure will be described. In the webbing retractor 10, when the emergent deceleration detecting sensor detects an emergent deceleration of a vehicle due to a collision or the like, the gas generator 50 supplies a high pressure gas into the piston cylinder 52, as described above. As a result, the piston 54 moves the rack 46 from the standly position linearly toward the pinion 42 along the pitch line $P_L$. When the rack 46 is at the standly position, the tooth face of a front end of the initial end tooth 46A is in contact with the pressure receiving surface 58 of the initial driving member 56. When from this condition, the rack 46 is moved in a direction toward the pinion 42 along the pitch line $P_L$ and then the initial end tooth 46A presses the pressure receiving surface 58, the initial driving member 56 converts a part of the initial driving force from the rack 46 to a force (rotation force) in the direction of a tangent line of the pitch circle $P_c$ of the pinion 42. The shearing pin holding the pinion 42 and rotor 36 at the initial position is sheared by this rotation force so that the pinion 42 and the rotor 36 start to rotate in the taking-up direction W. After starting to rotate, the rotor 36 rotates relative to the holding plate 34 in the taking-up direction W of the webbing. As a result, the rollers 32 in the roller accommodating portions 36B are moved to the ON position in which they are nipped under a pressure between the outer peripheral face 40B of the rotary coupling portion 40 and the inside peripheries (edges) of the roller accommodating portions 36B. When three rollers 32 are moved to the respective ON positions, the rotor 36 is fixed to the torque transmission shaft 30 with respect to the taking-up direction W so that the one-way clutch 28 is in the ON state allowing a torque in the taking-up direction to be transmitted to the spool 20.

When the one-way clutch 28 gets into the ON state as described above, the initial driving member 56 receiving the initial driving force starts to rotate the spool 20 in the taking-up direction W. The spool 20 continues to be rotated by the initially driving member 56 for receiving the initial driving force from the rack 46 until the initial end tooth 46A of the rack 46 engages the pinion 42, and after the initial end tooth 46A engages the pinion 42, the rotation of the spool 20 is continued by the pinion 42 receiving the driving force (steady driving force) from the rack 46. Because the initially driving member 56 is extended outward in the radius direction relative to the pinion 42, when the pinion 42 is rotated up to near where the tooth 42A engages the rack 46, the end portion of the initial driving member 56 is moved to a place where it bite into the rack 46 and then inserted into the recess 46E of the rack 46. A gap is formed between the initial driving member 56 and the rack 46 by this recess 46E, so that the initial driving member 56 does not come into contact with the rack 46. When the operation of the piston driving device 48 is finished, the rack 46 is moved to a terminal position as shown in FIG. 3 so as to rotate the spool 20 linked with the pinion 42 in the taking-up direction W fully to eliminate as lack of the webbing. However, when the slack of the webbing is eliminated before the rack is moved to the terminal position, it is stopped before the terminal position.

Figure 4:
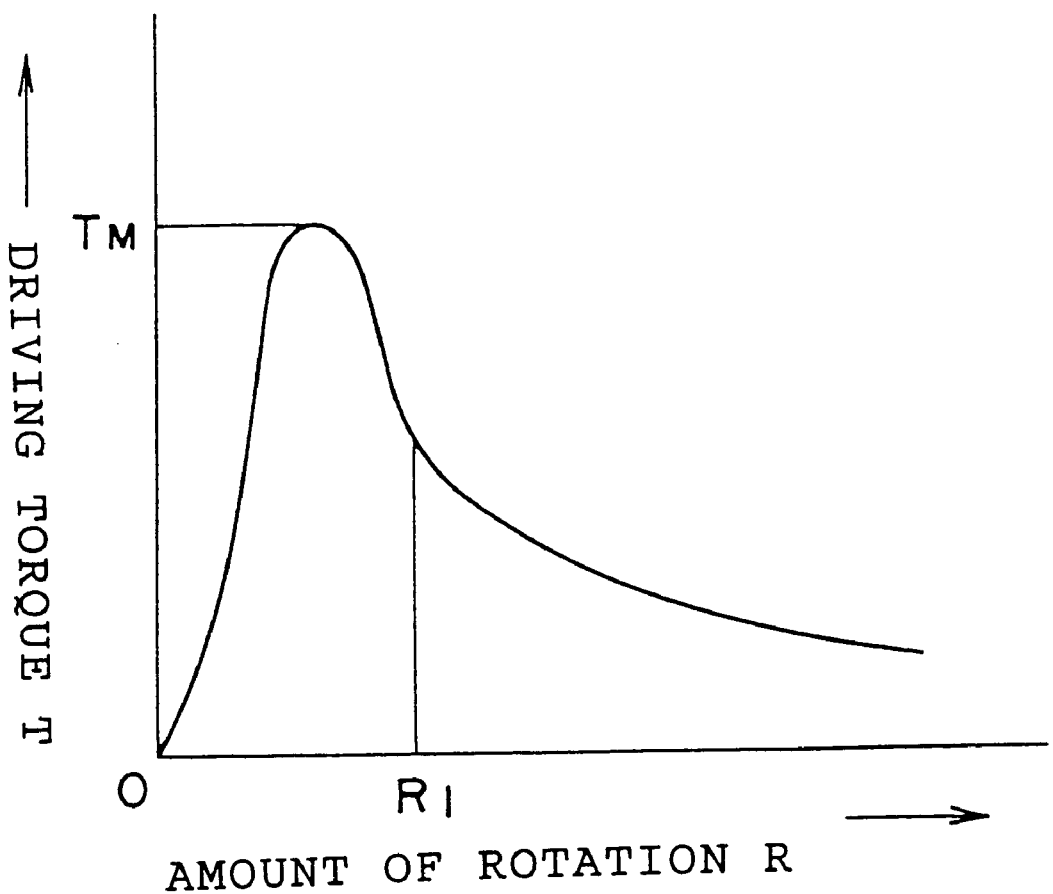
FIG. 4 is a graph showing a relation between a rotation amount of the pinion just after its tarts to rotate and a driving torque in the webbing retractor according to the first embodiment of the present invention.

In the taking-up operation for the webbing 20, just after the spool 20 begins to rotate in the taking-up direction , as compared to the steady time in which the spool is rotating continuously, the driving torque (rotation load) for rotating the pinion 42 increases due to static frictional resistance and operational resistance generated until the one-way clutch 28 is turned to the ON state. In the webbing retractor 10 according to the first embodiment, as shown in FIG. 4, the pinion 42 rotates by a predetermined rotation amount R. after the rotation starts and after the driving torque of the pinion 42 drops from its maximum value $T_M$, the rack 46 meshes with the pinion 42.

In the webbing retractor 10 according to the first embodiment described above, when the piston driving device 48 is actuated so that the rack 46 begins to move in the direction toward the pinion 42 along the pitch line $P_L$, the initial driving member 56 receives an initial driving force (applied pressure) from the rack 46 so as to rotate the pinion 42 in the taking-up direction. Because the initial driving force from the rack 46 is not applied directly to the teeth of the pinion 42, even when a traveling speed and applied pressure of the rack 46 by the piston driving device 48 are large, it is possible to prevent the teeth of the pinion 42 from being damaged by the initial driving force. The initial driving force from the rack 46 mentioned here refers to a pressure and impact force applied to the initial driving member 56 and the pinion 42 by the rack 46 in a period since the rack 46 begins to be moved by the piston driving device 48 until it meshes with the pinion 42. As a result, by reducing the size of the pinion 42 or the pitch circle of the pinion 42 without changing the material or the like of the pinion 42, the length of the rack 46 can be reduced, so that a traveling range of the rack 46 by the piston driving device 48 can be reduced, thereby making it possible to achieve a small-size webbing retractor 10.

The pressure receiving surface 58 of the initial driving member 56 is formed by an involute curve common to the pinion 42 and this pressure receiving surface 58 forms a smooth involute curve together with the tooth 42C of the pinion 42. Therefore, the torque and angular velocity of the pinion 42 when rotated by the initial driving member 56 receiving the initial driving force from the rack 46 become substantially the same as the torque and angular velocity of the pinion 42 rotated in mesh with the rack 46. Further, when the rack 46 is released from the initial driving member 56 and meshes with the pinion 42, the rotation of the pinion 46 does not become intermittent. Thus, the characteristics in torque and angular velocity of the piston driving device 48 from a start to an end of the driving can be made constant.

Second Embodiment

Figure 5:
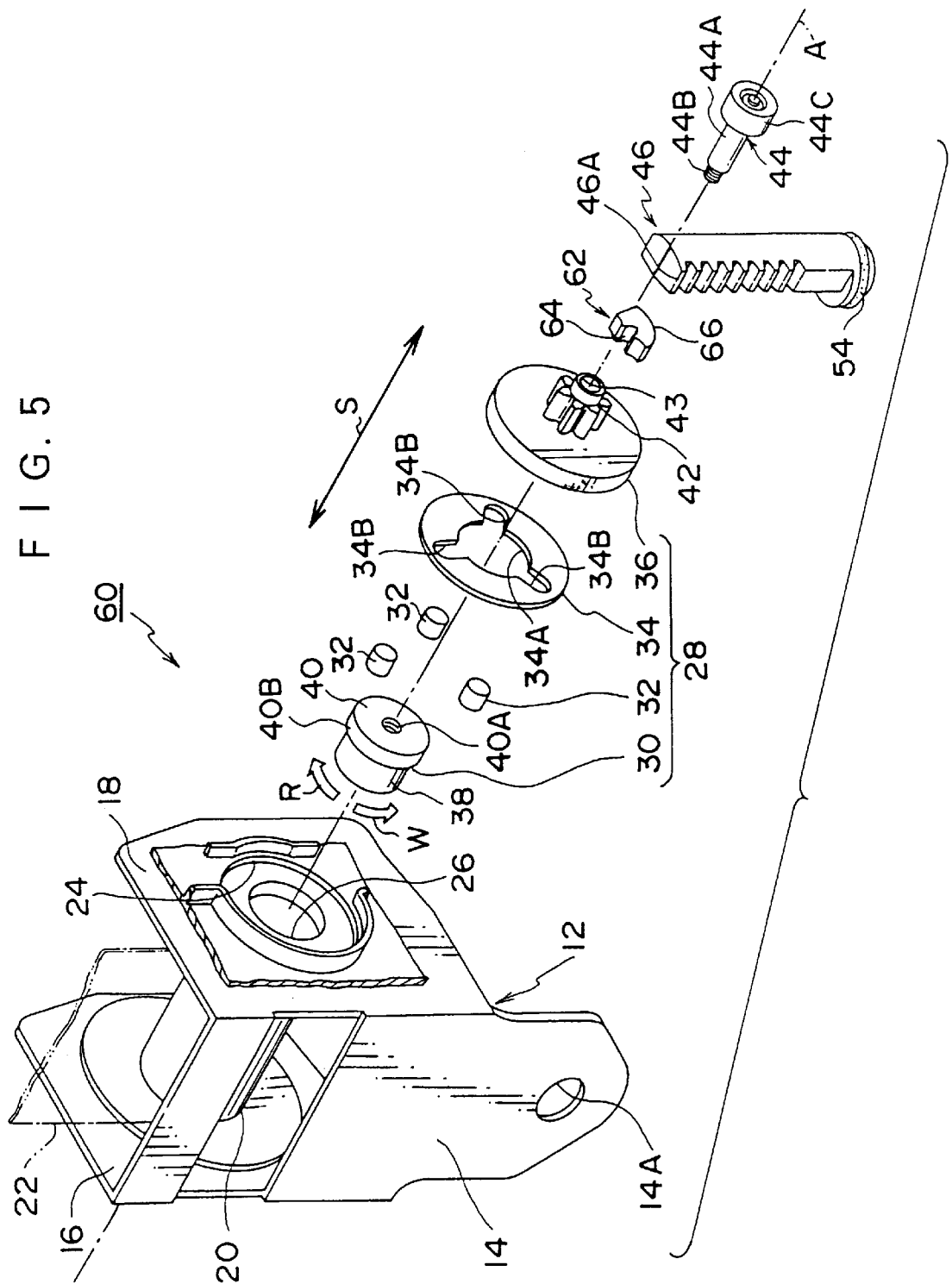
FIG. 5 is a disassembly perspective view showing a structure of a webbing retractor according to a second embodiment of the present invention.
Figure 6:
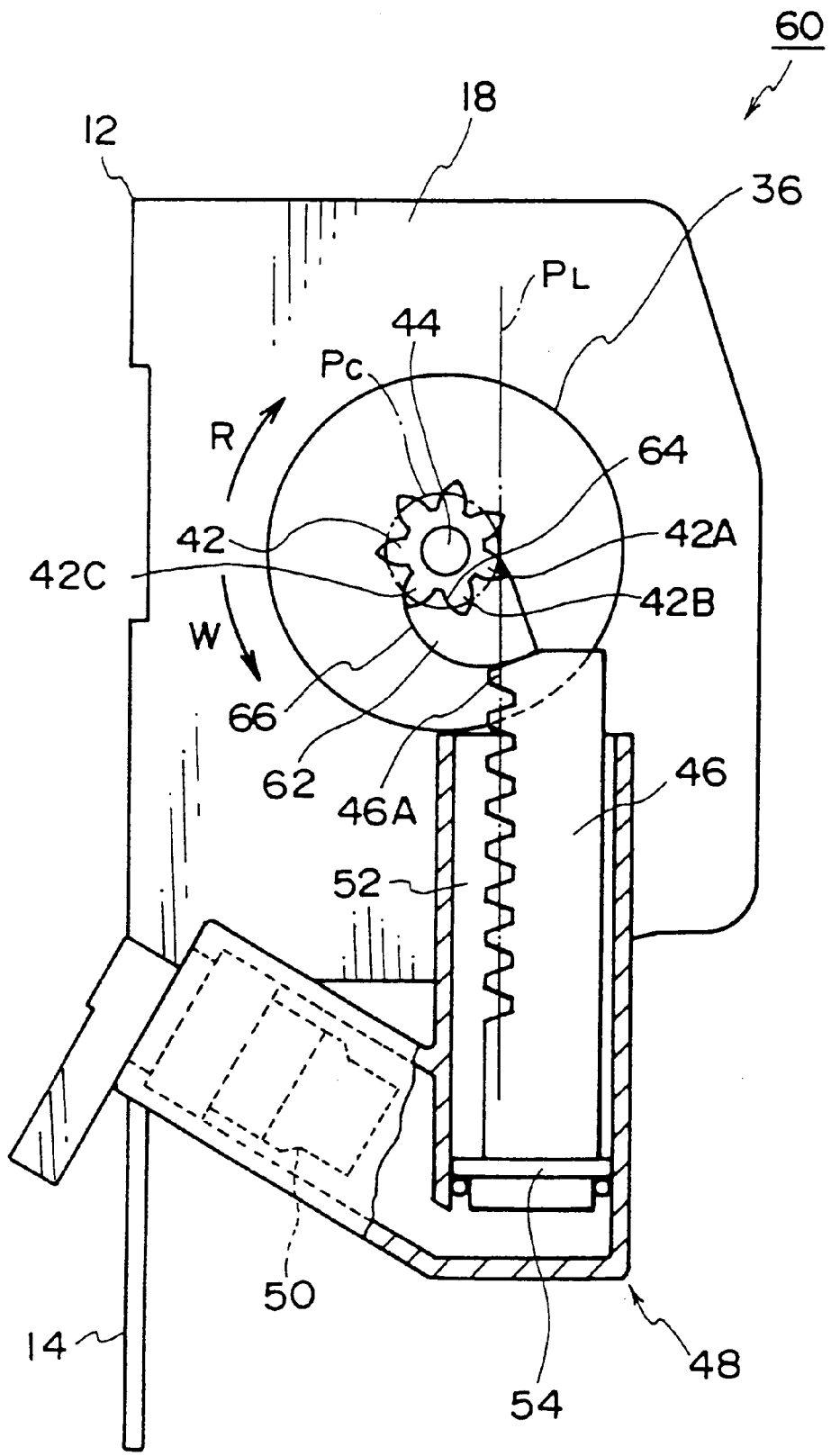
FIG. 6 is a plan view showing a state before a piston driving device of the webbing retractor according to the second embodiment of the present invention is actuated.

FIGS. 5 to 7 show a webbing retractor according to a second embodiment of the present invention. For the webbing retractor 60 according to the second embodiment, the same reference numerals denotes basically the same components as the webbing retractor of the first embodiment and a description thereof is omitted. An initial driving member 62 extending from an outer periphery of the pinion 42 outward in the radius direction is fitted to the pinion 42 coaxially therewith. The initial driving member 62 is disposed so as to be in contact with an outside side face of the rotor 36 in the axial direction S. The initial driving member 62 has a fitting face 64 which fits continuous three teeth 42A, 42B, 42C of the pinion 42 without any gap as shown in FIG. 5. In the initially driving member 62, the fitting 64 is fitted to the teeth 42A, 42B, 42C and the movement thereof in the radius direction is blocked by a shearing pin (not shown) made of resin inserted through the initial driving member 62 and rotor 36 such that it is fixed to the pinion 42.

In the initial driving member 62 according to the second embodiment, like the initial driving member 56 of the first embodiment, a pressure receiving face 66 in contact with the initial end tooth 46A of the rack 46 is formed in an involute curve common to the pinion 42. As shown in FIG. 6, this pressure receiving face 66 forms a smooth involute curve with a one side tooth face of the tooth 42C in a condition that the initial driving member 62 is fitted to the pinion 42. The rack 46 has no recess for the initially driving member 62 unlike the first embodiment.

Next, an operation of the webbing retractor according to the second embodiment having such a structure will be described. In the webbing retractor 60 of the second embodiment, an operation after the piston driving device 48 starts its action until the initial end tooth 46A of the rack 46 meshes with the pinion 42 is the same as in the webbing retractor 10 of the first embodiment, and therefore a description thereof is omitted. In the webbing retractor 60 of the second embodiment, after the initial end tooth 46A of the rack 46 moved by the piston driving device 48 in the direction toward the pinion 42 along the pitch line $P_L$ meshes with the pinion 42, the rotation of the spool 20 is continued by the pinion 42 receiving the driving force from the rack 46. Because the initial driving member 62 extends outward in the radius direction relative to the pinion 42, when the tooth 42A of the pinion 42 is rotated near a position where it meshes with the rack 46, an end portion of the initial driving member 62 comes into contact with a tooth end of the rack 46. Although the initial driving member 62 is fixed in the radius direction by the shearing pin as described previously, this shearing pin is sheared by a shearing force generated when the initial driving member 62 comes into contact with the rack 46. As a result, when the initial driving member 62 comes into contact with the rack 46, it slips out of the pinion 42. Therefore, the pinion 42 is rotated by a driving force from the rack 46 without being interfered by the initial driving member 62. When the operation of the piston driving device 48 is terminated, the rack 46 is moved up to the terminal position shown in FIG. 7 so as to rotate the spool 20 connected to the pinion 42 sufficiently in the taking-up direction W to cancel the slack of the webbing 22. However, when the slack of the webbing 22 is cancelled before the rack 46 reaches the terminal position, the rack 46 stops before the terminal position.

In the webbing retractor 60 according to the second embodiment described above, in addition to the effect of the webbing retractor of the first embodiment, because it is not necessary to form the recess from the initial driving member 62 by thinning the thickness of part of the teeth of the rack 46, production of the rack 46 is facilitated and further there never occurs a phenomenon that the strength of the rack 46 is reduced by thinning of the tooth width of the rack 46.

(Modification 1 of the second embodiment)

Figure 8:
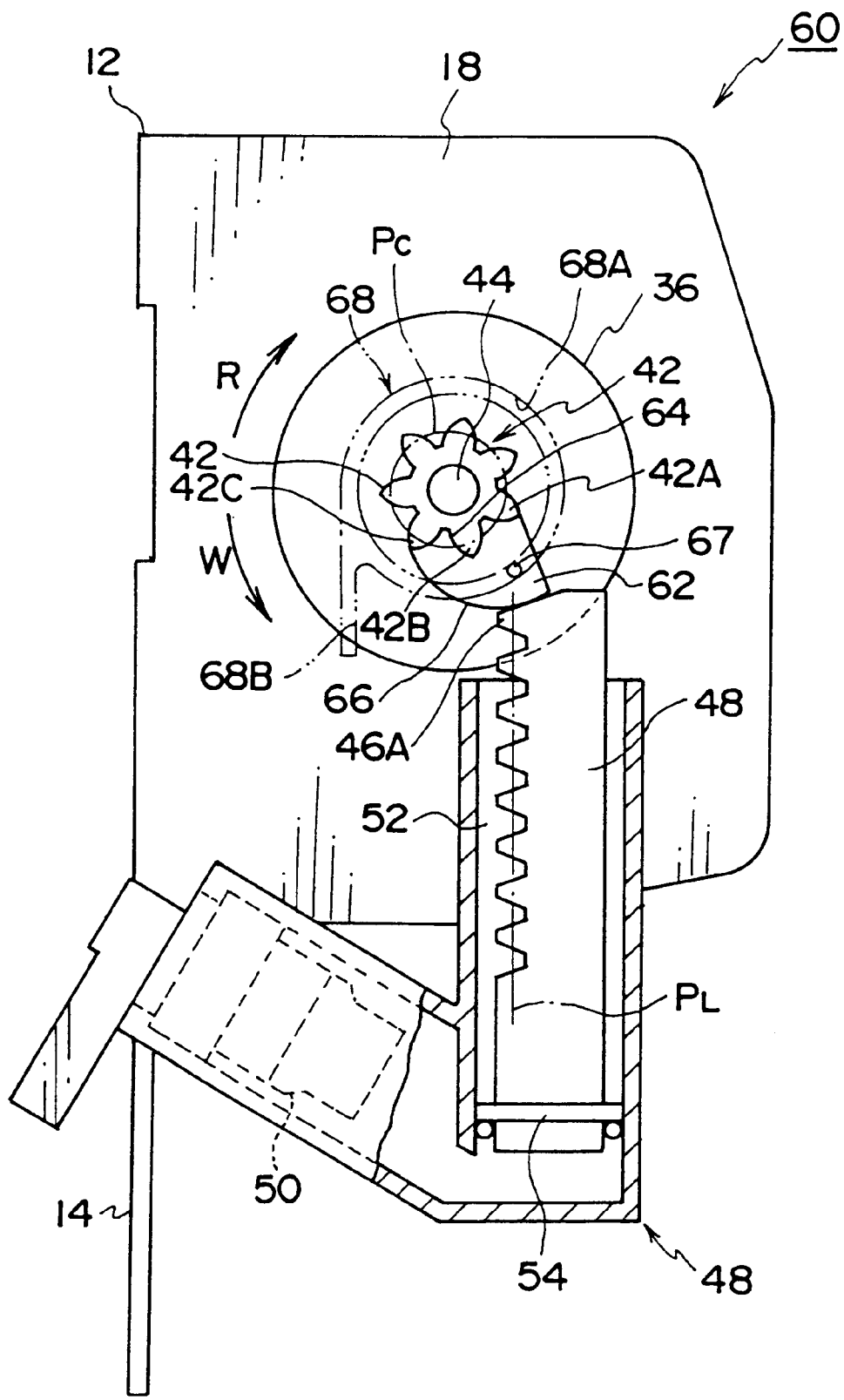
FIG. 8 is a plan view showing a state before a piston driving device of the webbing retractor according to modification 1 of the second embodiment of the present invention is actuated.
Figure 9:
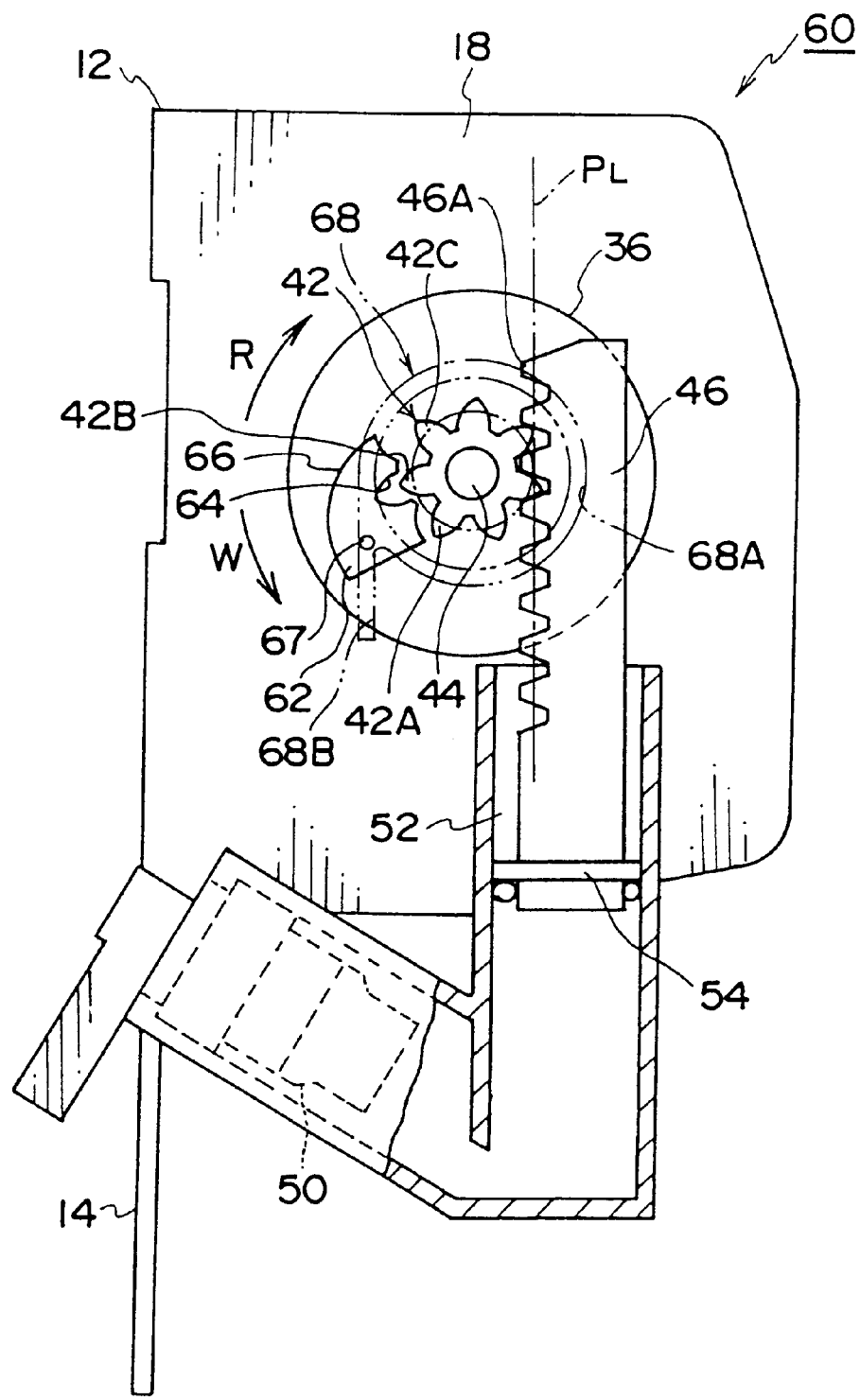
FIG. 9 is a plan view showing a state in which the piston driving device of the webbing retractor according to the second embodiment of the present invention is actuated and the initially driving member is released from the pinion.
Figure 10:
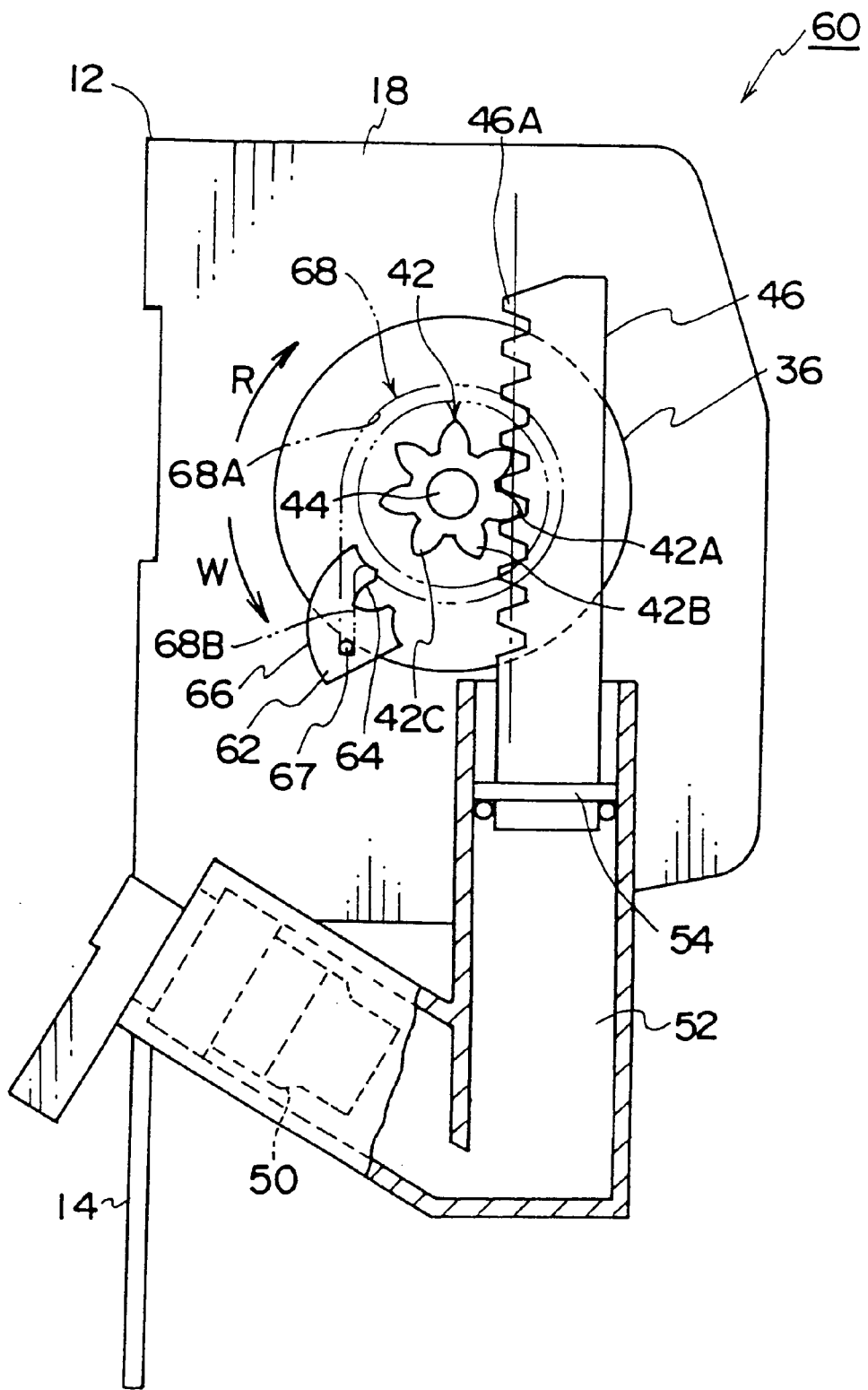
FIG. 10 is a plan view showing a state in which the piston driving device of the webbing retractor according to the second embodiment of the present invention completes its action.

FIGS. 8 to 10 show a webbing retractor according to modification 1 of the second embodiment of the present invention. As shown in FIG. 8, the initial driving member 62 has a round bar like guide pin 67 which is provided on an outside side face thereof with respect to the axial direction S and projected in the axial direction S. Viewing in the diameter direction, this guide pin 67 is disposed substantially in the center between the pitch circle $P_c$ of the pinion 42 and an outside periphery of the initial driving member 62. A cover member (not shown) for covering the one-way clutch 28 and pinion 42 is fixed on the side plate 18 and a guide groove 68 which is a concave groove in which an end portion of the guide pin 67 is to be inserted is formed on an inside face opposing the side plate 18.

The guide groove 68 comprises an annular portion 68A formed along a circle trajectory with a length substantially the same as a distance from the axis A to the guide pin 67 as its radius around the axis A as shown by two-dots and dash line, and a linear portion 68B extending from this annular portion 68A in the direction of a tangent line on the annular portion 68A. Here, the linear portion 68A is branched from the annular portion 68A in the vicinity of a position opposite to an intersection position of the pitch circle $P_c$ and pitch line $P_L$ with respect to the axis A and substantially parallel to the pitch line $P_L$.

Next, an operation of the webbing retractor according to modification 1 of the second embodiment having such a structure will be described. In the webbing retractor 60, when the piston driving device 48 is actuated like in the webbing retractor 10 of the first embodiment, the rack 46 is moved along the pitch line $P_L$ and the initial end tooth 46A of the rack 46 applies a pressure to the pressure receiving surface 66 of the initial driving member 62. As a result, the initial driving member 62 converts the initial driving force from the rack 46 to a rotation force. Then, the pinion 42 is rotated in the taking-up direction W by the rotation force from the initial driving member 62. At this time, because the guide pin 67 of the initial driving member 62 is positioned in the annular portion 68A of the guide groove 68, the initial driving member 62 is not capable of moving except along the annular portion 68A and the movement thereof in the diameter direction around the axis A is blocked. Therefore, in a condition in which the guide pin 67 is positioned in the annular portion 68A, the initial driving member 62 is not released from the teeth 42A, 42B, 42C of the pinion 42, so that it is rotated integrally with the pinion 42 by the initial driving force.

At the same time when the pinion 42 starts to rotate in the taking-up direction W, the one-way clutch 28 gets into the ON state allowing a torque in the taking-up direction W to be transmitted to the spool 20. When the one-way clutch 28 gets into the ON state, the initial driving member 62 receiving the initial driving force from the rack 46 starts the rotation of the spool 20 in the taking-up direction W.

After the rack 46 meshes with the pinion 42, the rotation of the pinion 42 and spool 20 is continued by the driving force from the rack 46. If the guide pin 67 moving along the annular portion 68A reaches the branch position to the linear portion 68B, because the guide pin 67 is forced to move along a wall portion on the outside periphery of the guide groove 68 by a centrifugal force, the guide pin 67 enters the linear portion 68B from the annular portion 68A as shown in FIG. 9. The guide pin 67 entering the linear portion 68B is moved linearly along the linear portion 68B by an inertia force of the initial driving member 62. When the guide pin 67 is moved along the linear portion 68B, the initial driving member 62 is moved to the outside peripheral side relative to the pinion 42, so that just after the guide pin 67 enters the linear portion 68B, the fitting face 64 is separated from the teeth 42A, 42B, 42C. When the guide pin 67 is moved up to the terminal end of the linear portion 68b as shown in FIG. 10, the initial driving member 62 is stopped. In a condition in which the guide pin 67 is located at the terminal end of the linear portion 68B, the initial driving member 62 is held at a position in which it is not in contact with the pinion 42.

In the webbing retractor 60 according to the modification 1 of the second embodiment, in addition to the effect of the webbing retractor 10 of the first embodiment, because it is not necessary to form the recess from the initial driving member 62 by thinning part of the teeth of the rack 46, production of the rack 46 is facilitated and there never occurs a phenomenon in which the strength of the rack 46 is reduced by thinning the tooth width of the rack 46. Further, because the annular portion 68A of the guide groove 68 for restricting the movement direction of the initial driving member 62 to peripheral direction makes the initial driving member 62 rotate integrally with the pinion 42 when the initial driving force is transmitted to the pinion 42, the initial driving member 62 does not slip out of the pinion 42 during a transmission of the initial driving force, and the initial driving force can be transmitted securely to the pinion 42 through the initial driving member 62. Further, the liner portion 68B of the guide groove 68 releases the initial driving member 62 from the pinion 42 after the transmission of the initial driving force is completed, so that the initial driving member 62 is not in contact with the pinion 42 and the rack 46 after the transmission of the initial driving force is completed. Therefore, the rotation of the pinion 42 can be continued by the rack 46 which meshes with the teeth of the pinion 42 without being obstructed by the initial driving member 62.

Third Embodiment

Figure 11:
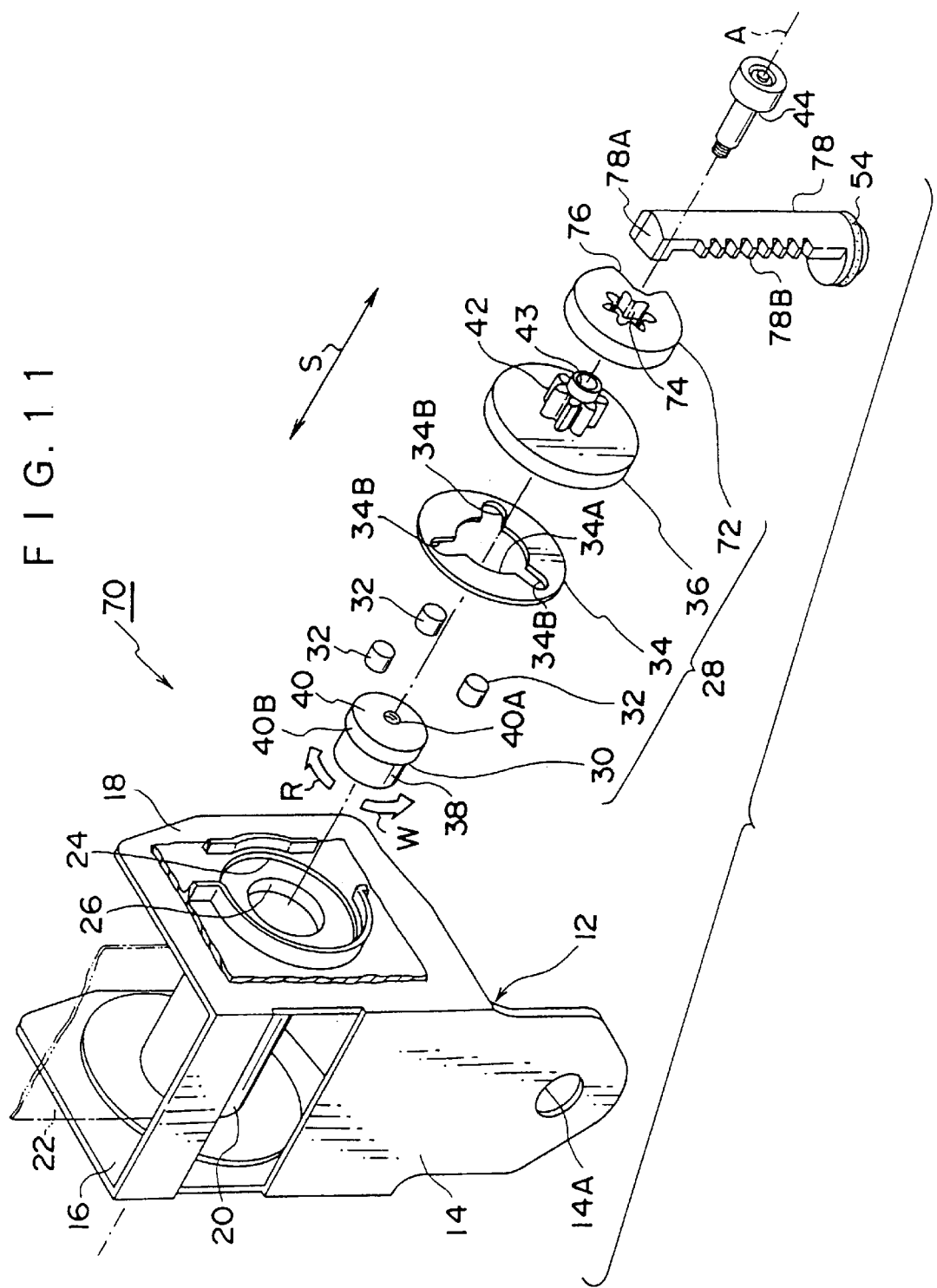
FIG. 11 is a disassembly perspective view showing a structure of a webbing retractor according to a third embodiment of the present invention.
Figure 12:
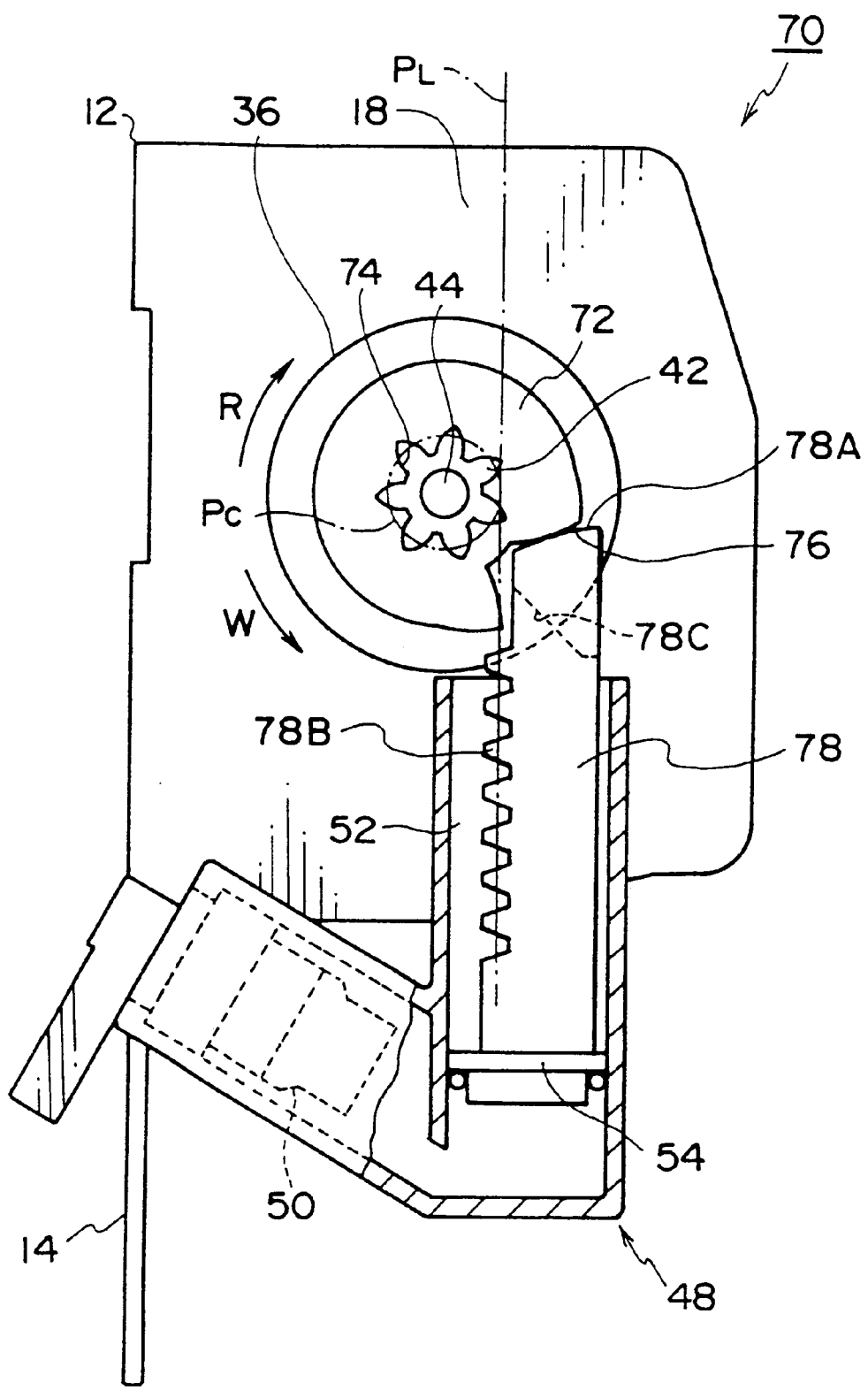
FIG. 12 is a plan view showing a state before a piston driving device of the webbing retractor according to the third embodiment of the present invention is actuated.
Figure 13:
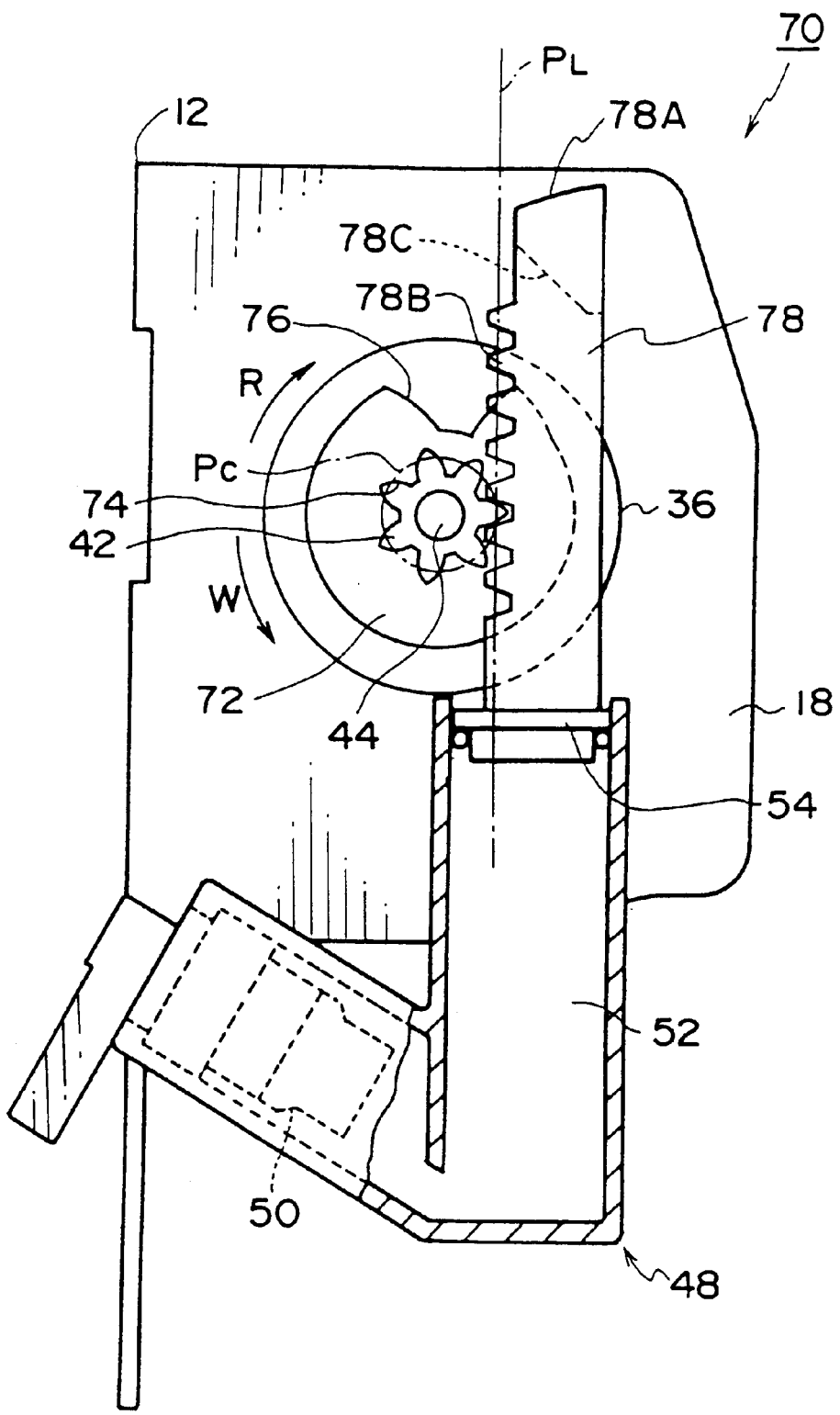
FIG. 13 is a plan view showing a state in which the piston driving device of the webbing retractor according to the third embodiment of the present invention completes its action.

FIGS. 11 to 13 show a webbing retractor according to a third embodiment of the present invention. For the webbing retractor 70 of the third embodiment, the same reference numerals denote basically the same components as the webbing retractor 10 of the first embodiment and a description thereof is omitted. The webbing retractor 70 of this embodiment has a substantially circular plate-shaped initial driving member 72 as shown in FIG. 11. The initial driving member 72 contains a fitting hole 74 which passes through the axis A in the axial direction S. An opening shape of this fitting hole 74 is substantially the same as a cross section perpendicular to the axis of the pinion 42 and the pinion 42 is insertable into this hole. The thickness of the initial driving member 72 is formed smaller than that of the pinion 42. Thus, by inserting the pinion 42 into the fitting hole 74, the initial driving member 72 is supported coaxially with the pinion 42 and is prevented from rotation relative, to the pinion 42. The initial driving member 72 in which the pinion 42 is inserted into the fitting hole 74 is installed on the outside side face of the rotor 36.

The initial driving member 72 has a concave portion which is a substantially trapezoidal concavity formed on a part of an outer periphery thereof in a direction to the axis A as shown in FIG. 12. A pressure receiving surface 76 constituted of an involute curve is formed in this concave portion.

On the other hand, the end face 78A of the rack 78 is formed substantially parallel to a tooth face on a side near the end face 78A of the tooth 78B. In the rack 78, teeth 78B are formed from a position retreated from the end face 78A toward the rear end. As shown in FIG. 11, only the front end portion of the rack 78 is formed with a substantially the same width as the tooth width of the pinion 42 and the rear portion with respect to this front end portion is formed thinner by a thickness of the initial driving member 72. The rack 78 is supported such that the outside side face of the tooth 78B coincides with the outside side face of the pinion 42 and a recess 78C from the initial driving member 72 is formed in a portion facing the side plate 18 with respect to the teeth 78B.

When the webbing retractor 70 is mounted on a vehicle as shown in FIG. 12, the pinion 42 is adjusted at such an initial position that the pressure receiving surface 76 of the initial driving member 72 is in contact with the end face 78A of the rack 78 and this initial position is held with the shearing pin like the first embodiment.

Next, an operation of the webbing retractor according to the third embodiment having such a structure will be described. In the webbing retractor 70 of the third embodiment, because the operation until the piston driving device 48 is actuated is the same as in the webbing retractor 10 of the first embodiment, a description of this operation is omitted. In the webbing retractor 70, when the piston driving device 48 is actuated, the rack 78 is moved toward the pinion 42 along the pitch line $P_L$, the end face 78A presses the pressure receiving surface 76. As a result, the initial driving member 72 converts a part of the initial driving force from the rack 78 to a force (rotation force) in the direction of a tangent line relative to the pitch circle $P_c$ of the pinion 42. The shearing pin holding the pinion 42 and the rotor 36 is sheared by this rotation force so that the pinion 42 and the rotor 36 start the rotation in the taking-up direction W. The rotor 36 starting the rotation rotates in the taking-up direction W relative to the holding plate 34. As a result, the rollers 32 in the roller holding portions 36B are moved from the OFF position to the ON position in which they are nipped with a pressure between the outer peripheral face 40B of the rotary coupling portion 40 and the inside peripheral faces (edges) of the roller holding portions 36B. The three rollers 32 are moved to the respective ON positions and then the rotor 36 is fixed to the torque transmission shaft 30 with respect to the taking-up direction W, so that the one-way clutch 28 gets into the ON state in which it is capable of transmitting the torque in the taking-up direction W to the spool 20.

If the one-way clutch 28 gets into the ON state, the initial driving member 72 receiving the initial driving force from the rack 78 starts to rotate the spool 20 in the taking-up direction W. The spool 20 is rotated by the rotation force of the initial driving member 72 until the tooth 78B at the beginning end of the rack 78 meshes with the pinion 42. After the tooth 78B meshes with the pinion 42, the rotation of the spool 20 is continued by the pinion 42 receiving a driving force from the rack 78. Here, because the initial driving member 72 is extended outward in the radius direction with respect to the pinion 42, when the pinion 42 is rotated from the initial position, the outer peripheral face of the initial driving member 76 is moved to a position where it bites into the rack 46 and then is inserted into the recess 78C of the rack 78. By this recess 78C, there is formed a gap between the initial driving member 72 and rack 78 so that the initial driving member 72 does not come into contact with the rack 76. When the operation of the piston driving device 48 is terminated, the rack 78 is moved up to the terminal position shown in FIG. 13 so as to rotate the spool 20 connected to the pinion 42 sufficiently to remove a slack of the webbing. However, when the slack of the webbing is removed before the rack 78 reaches the terminal position, it is stopped before the terminal position.

In the webbing retractor 70 of the third embodiment, in addition to the effect of the webbing retractor 10 of the first embodiment, because the pressure receiving surface 76 for receiving the initial driving force from the rack 78 is formed on the outer peripheral face of the initial driving member 72 formed in a disc shape, the strength of the pressure receiving surface is increased, so that the initial driving force which the pressure receiving surface 76 is capable of bearing can be increased.

Fourth Embodiment

Figure 14:
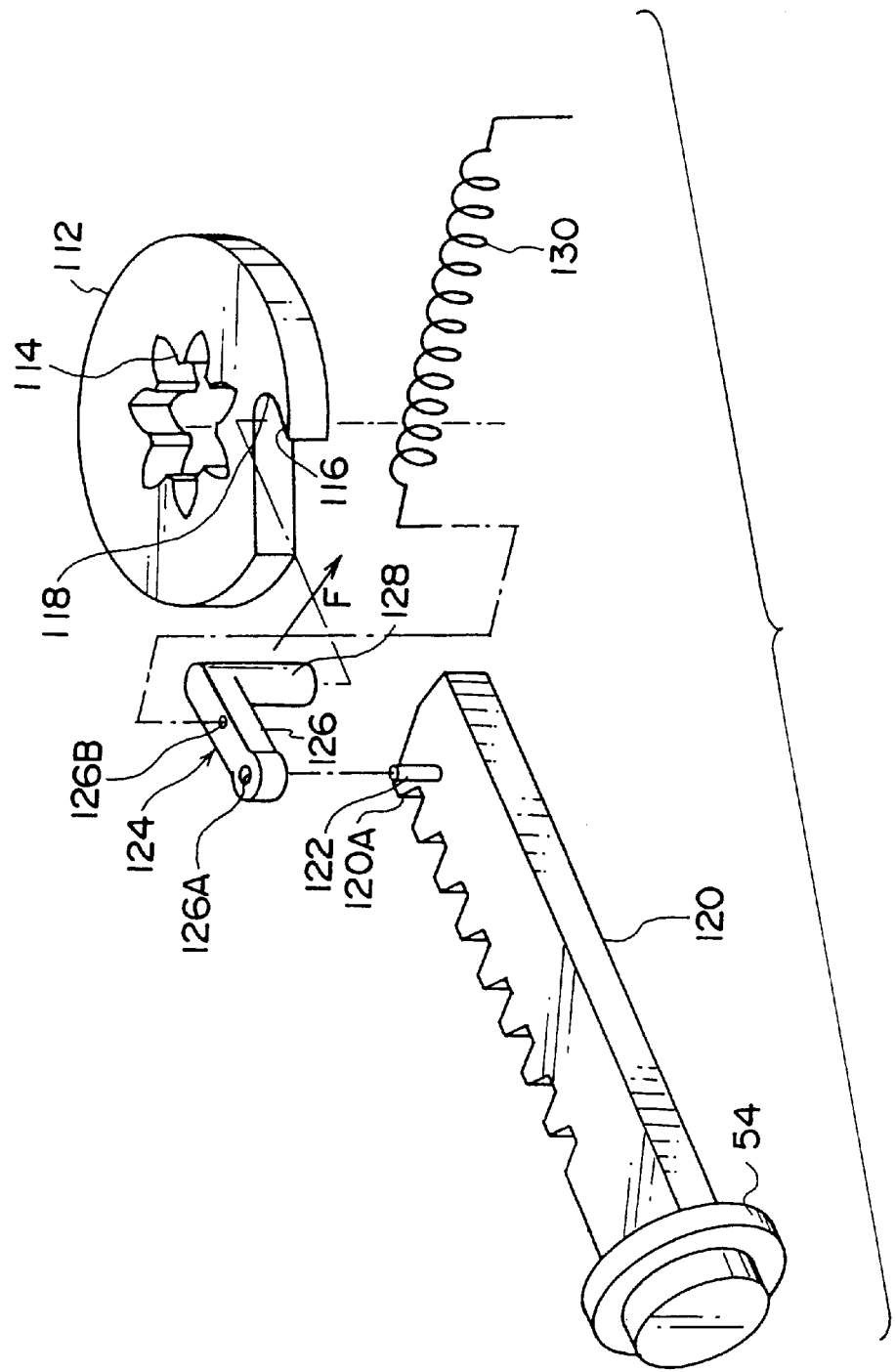
FIG. 14 is a disassembly perspective view showing an initially driving member, rack and driving force transmitting lever in the webbing retractor according to a fourth embodiment of the present invention.
Figure 15:
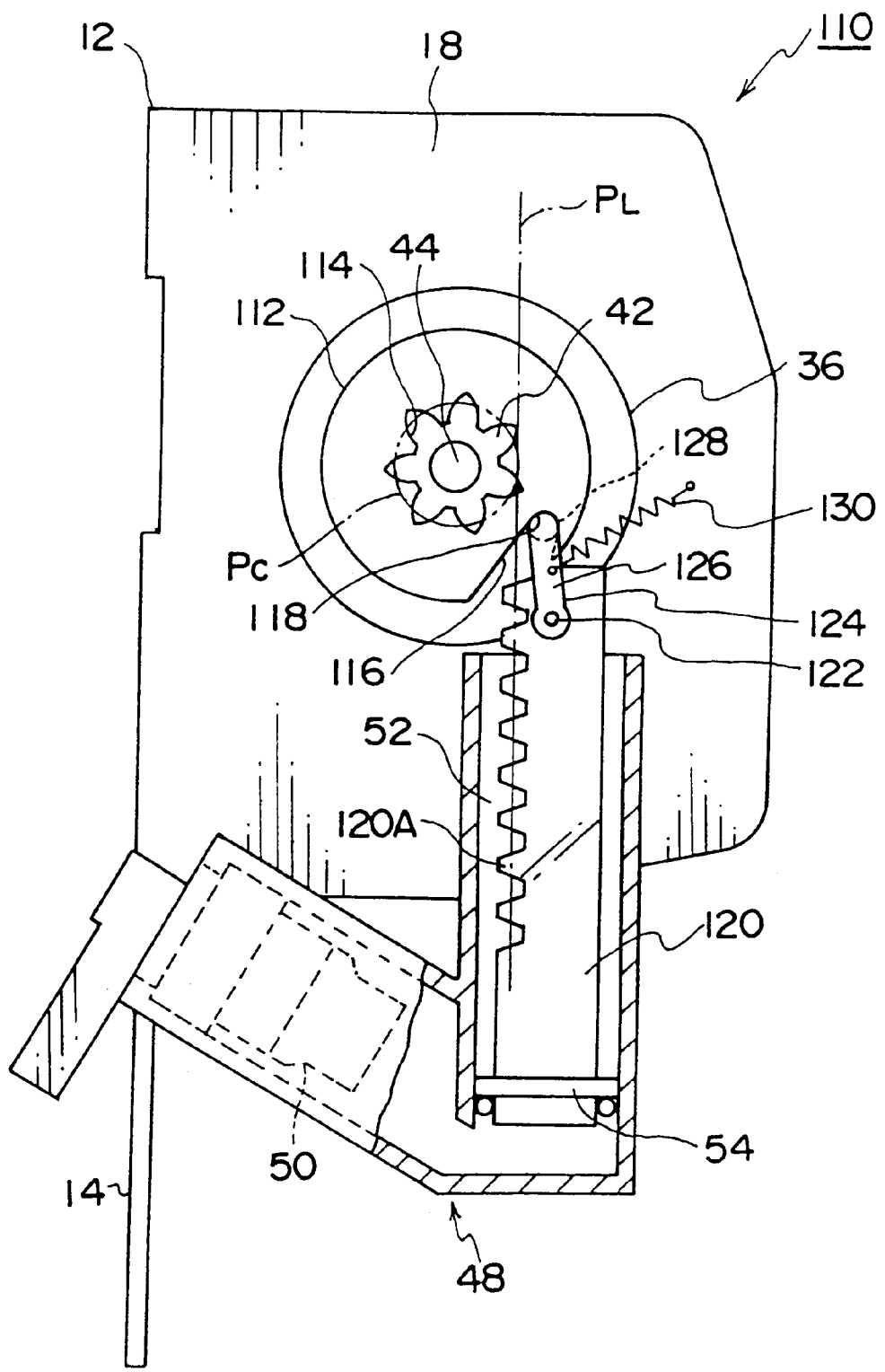
FIG. 15 is a plan view showing a state before a piston driving device of the webbing retractor according to the fourth embodiment of the present invention is actuated.
Figure 16:
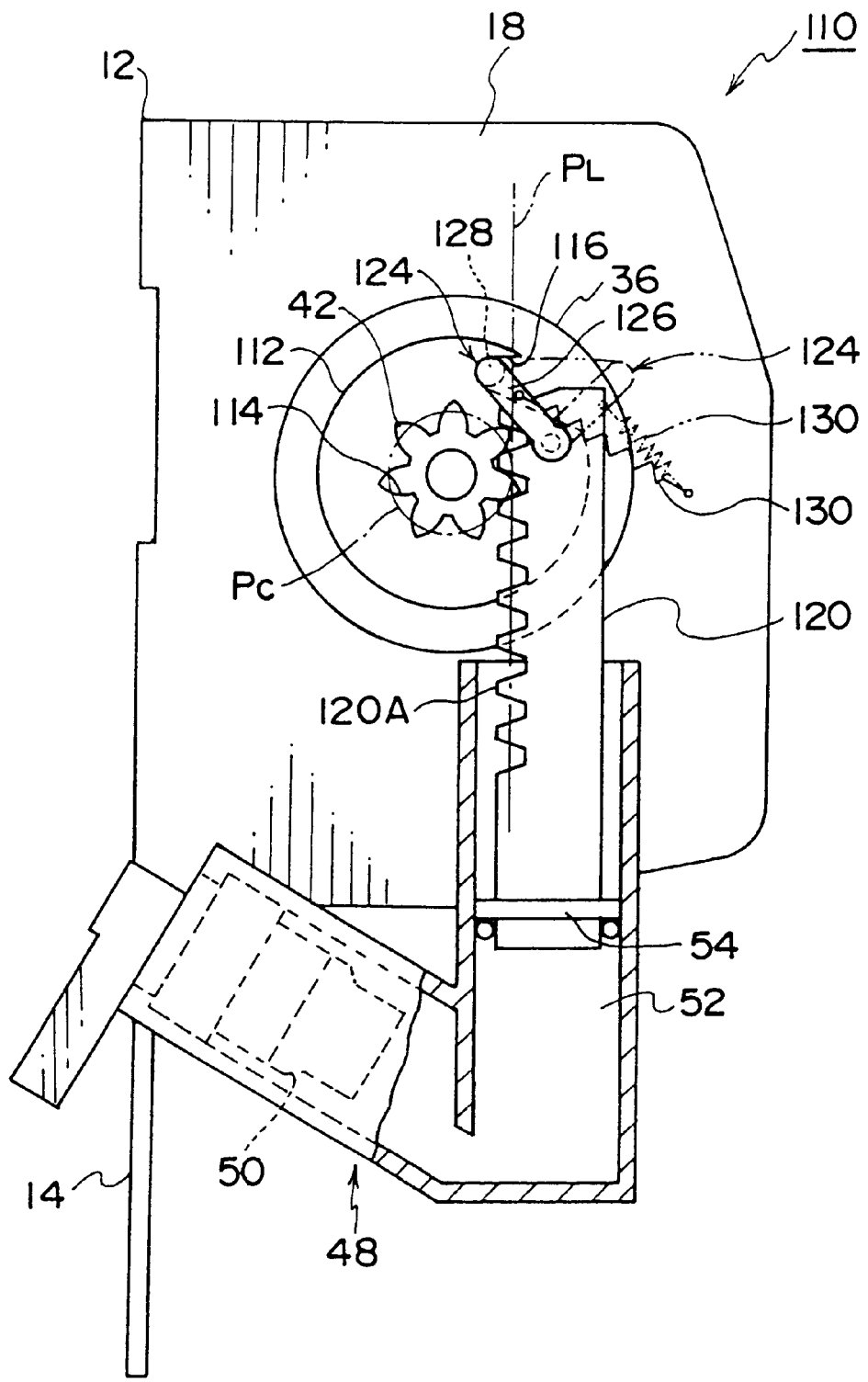
FIG. 16 is a plan view showing a state in which the piston driving device of the webbing retractor according to the fourth embodiment of the present invention completes its action.

FIGS. 14 to 16 show a webbing retractor according to a fourth embodiment of the present invention. For the webbing retractor 110 of the fourth embodiment, the same reference numerals denote basically the same components as the webbing retractor 10 of the first embodiment and a description thereof is omitted. The webbing retractor 110 has a substantially circular plate-shaped initial driving member 112 as shown in FIG. 14. The initial driving member 112 contains a fitting hole 114 which passes through the axis A in the axial direction S. An opening shape of this fitting hole 114 is substantially the same as a cross section perpendicular to the axis of the pinion 42 and the pinion 42 is insertable into this hole. The thickness of the initial driving member 112 is formed smaller than that of the pinion 42. Thus, by inserting the pinion 42 into the fitting hole 114, the initial driving member 112 is supported coaxially with the pinion 42 and is prevented from rotation relative to the pinion 42. The initial driving member 112 in which the pinion 42 is fitted in the fitting hole 114 is installed on the outside side face of the rotor 36.

The initial driving member 112 has an engagement groove 116 formed on an outer periphery thereof along the direction of a tangent line on the pitch circle $P_c$. The engagement groove passes through in the axial direction S. An end portion in the length direction is closed while the other end is open to the outer periphery of the initial driving member 112. An inner peripheral face at the end portion of the engagement groove is curved in U shape as viewed in the axial direction S and this end portion of the engagement groove 116 acts as a pressure receiving portion 118 for receiving the initial driving force.

On the other hand, the thickness of the rack 120 in the axial direction S is substantially the same as a difference between the thickness of the pinion 42 and the thickness of the initial driving member 112. As shown in FIG. 14, a round bar like shaft supporting pin 122 is provided on an end portion of the top surface of the rack 120 and this shaft supporting pin 122 is projected vertically from the top surface of the rack 120. The shaft supporting pin 122 supports a driving force transmitting lever 124 swingingly. The driving force transmitting lever 124 comprises a proximal end portion 126 whose section perpendicular to the length direction thereof is rectangular and a round bar like engagement portion 128 projected from an end portion of this proximal end portion 126, these portions being formed integrally with each other. A through hole 126A passing through top and bottom faces of the proximal end portion 126 is formed at the rear end portion of the proximal end portion 126. Further, an engagement hole 126B is formed in the center in the length direction of the top surface of the proximal end portion 126. The outside peripheral face of the engagement portion 128 is formed with a curved surface having a slightly smaller curvature radius than the curvature radius of the inner peripheral face of the pressure receiving portion 118 of the engagement groove 116. A projecting length of the engagement portion 128 from its proximal end is substantially the same as a sum of the thickness of the initial driving member 112 and the thickness of the rack 120.

The shaft supporting pin 122 on the top face of the rack 120 is inserted into the through hole 126A in the driving force transmitting lever 124. As a result, the driving force transmitting lever 124 is supported swingingly by the rack 120 with respect to the shaft supporting pin 122. An end portion bent in L shape of a coil spring 130 is inserted in and fixed to the engagement hole 126B of the driving force transmitting lever 124. The other end of the coil spring 130 is also bent in the L shape and disposed over the side plate 18 such that it is fixed to the cover member (not shown) for covering the one-way clutch 28 and pinion 42. At this time, the coil spring 130 is stretched in the length direction and therefore, the coil spring 130 always urges the front end of the driving force transmitting lever 124 in the direction to the bottom of the teeth of the rack 120 (direction indicated by an arrow F in FIG. 14).

When the webbing retractor 110 is installed on a vehicle as shown in FIG. 15, the pinion 42 is adjusted to the initial position in which the opening end of the engagement groove 116 of the initial driving member 112 faces the front end portion of the rack 120 and the pinion 42 is held at the initial position together with the initial driving member 112 with the shearing pin like the first embodiment. On the other hand, the rack 120 is also adjusted to the initial position in which the engagement portion 128 of the driving force transmitting lever 124 is inserted into the engagement groove 116 and in contact with the pressure receiving portion 118 of the engagement groove 116. At this time, the engagement portion 128 of the driving force transmitting lever 124 is urged by the coil spring 130 in a direction in which it retracts from the pinion 42.

Next, an operation of the webbing retractor according to the fourth embodiment having such a structure will be described. In the webbing retractor 110 of the fourth embodiment, because the operation until the piston driving device 48 is actuated is the same as in the webbing retractor 10 of the first embodiment, a description of this operation is omitted. In the webbing retractor 110, when the piston driving device 48 is actuated, the rack 120 is moved toward the pinion 42 along the pitch line $P_L$. As a result, the engagement portion 128 of the driving force transmitting lever 124 presses the pressure receiving portion 118 of the engagement groove 116 along the direction of the tangent line on the pitch circle $P_c$. The initial driving member 112 converts a pressure from the rack 120 just after the piston driving device 48 is actuated, namely the initial driving force, to a rotation force. Then, the pinion 42 is rotated by this rotation force in the taking-up direction W.

At the same time when the pinion 42 starts to rotate in the taking-up direction W, the one-way clutch 28 gets into the ON state in which it is capable of transmitting a torque in the taking-up direction W to the spool 20. When the one-way clutch 28 gets into the ON state, the initial driving member 112 starts to rotate the spool 20 in the taking-up direction W. The spool 20 is rotated by the rotation force from the initial driving member 112 until the beginning end tooth 120A of the rack 120 engages the pinion 42.

Just after the rack meshes with the pinion 42 as shown in FIG. 16, the initial driving member 112 makes the length direction of the engagement groove 116 substantially coincide with the urging direction for the engagement portion 128 by the coil spring 130. As a result, the engagement portion 128 of the driving force transmitting lever 124 is moved to the opening end portion along the engagement groove 116 and slips out of the engagement groove 116. After the engagement portion 128 is released from the engagement groove 116, the rotation of the spool 20 is continued by the pinion 42 receiving the driving force from the rack 120.

After released from the engagement groove 116, the driving force transmitting lever 124 is held at a position in which it is not in contact with the initial driving member 112 by the urging force of the coil spring 130 as shown by two-dots and dash line of FIG. 16. When the action of the piston driving device 48 is terminated, the rack 120 is moved up to a predetermined terminal position and rotates the spool 20 linked with the pinion 42 sufficiently in the taking-up direction W to cancel a slack of the webbing. However, if the slack of the webbing is cancelled before the rack reaches its terminal position, it is stopped before the terminal position.

In the webbing retractor 110 of the fourth embodiment, in addition to the effect of the webbing retractor of the first embodiment, the following effect can be obtained. That is, when a distance from the axis A to the pressure receiving portion 118 of the engagement groove 116 is changed, the driving torque and angular velocity of the pinion 42 to which the initial driving force is transmitted through the driving force transmitting lever 124 and the initial driving member 112 can be changed, so that the driving torque and angular velocity of the pinion can be adjusted depending on the characteristic of the rotation load applied to the pinion 42 at the initial phase of rotation startup. Further, because the driving force transmitting lever 124 is released from the engagement groove 116 of the initial driving member 112 after the transmission of the initial driving force is completed and then the driving force transmitting lever 124 does not come into contact with the initial driving member 112 and pinion 42 after the transmission of the initial driving force is completed. Thus, the pinion 42 can continue to be rotated without being obstructed by the initial driving member 112.

Fifth Embodiment

Figure 17:
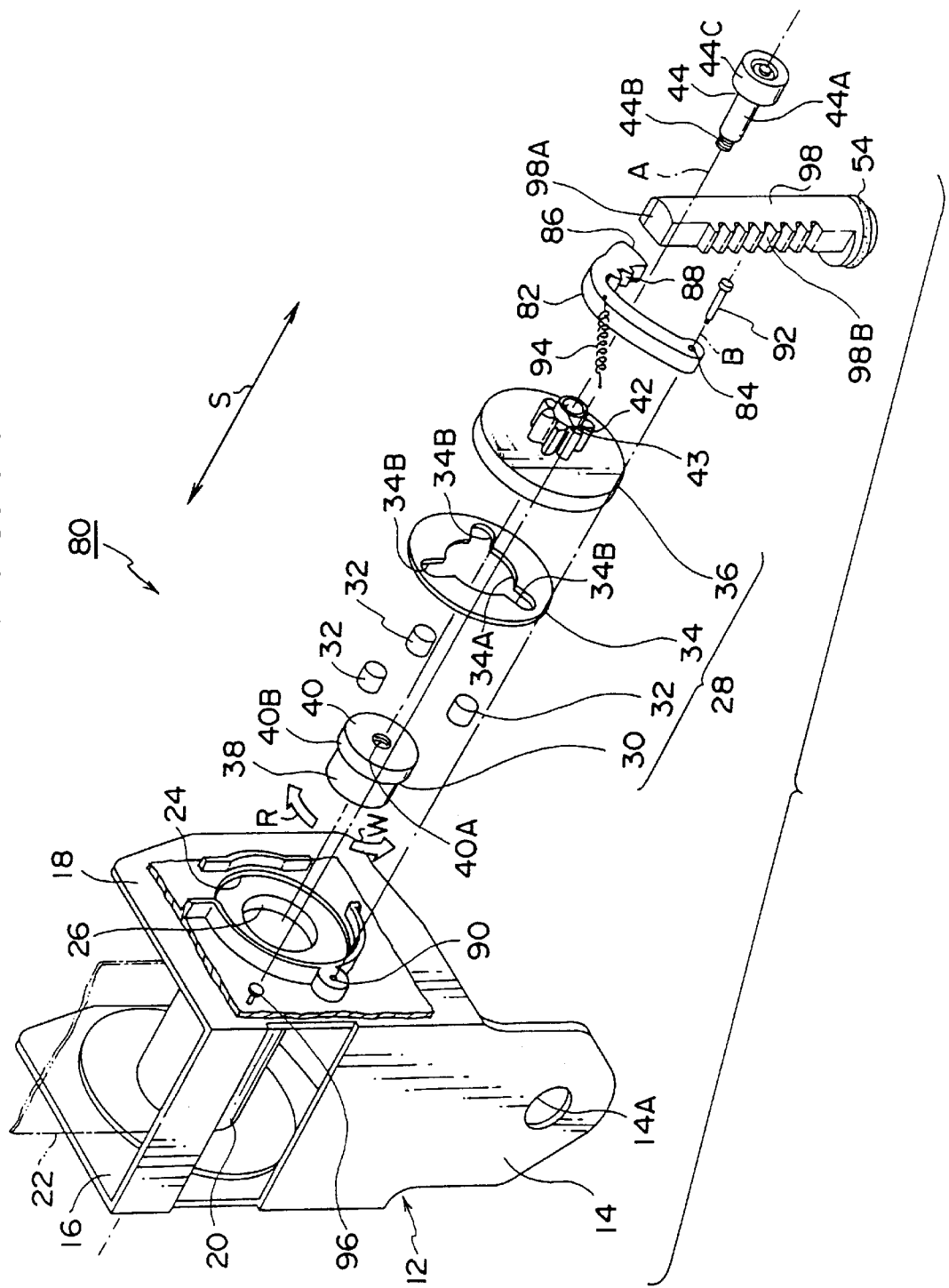
FIG. 17 is a disassembly perspective view showing a structure of a webbing retractor according to a fifth embodiment of the present invention.
Figure 18:
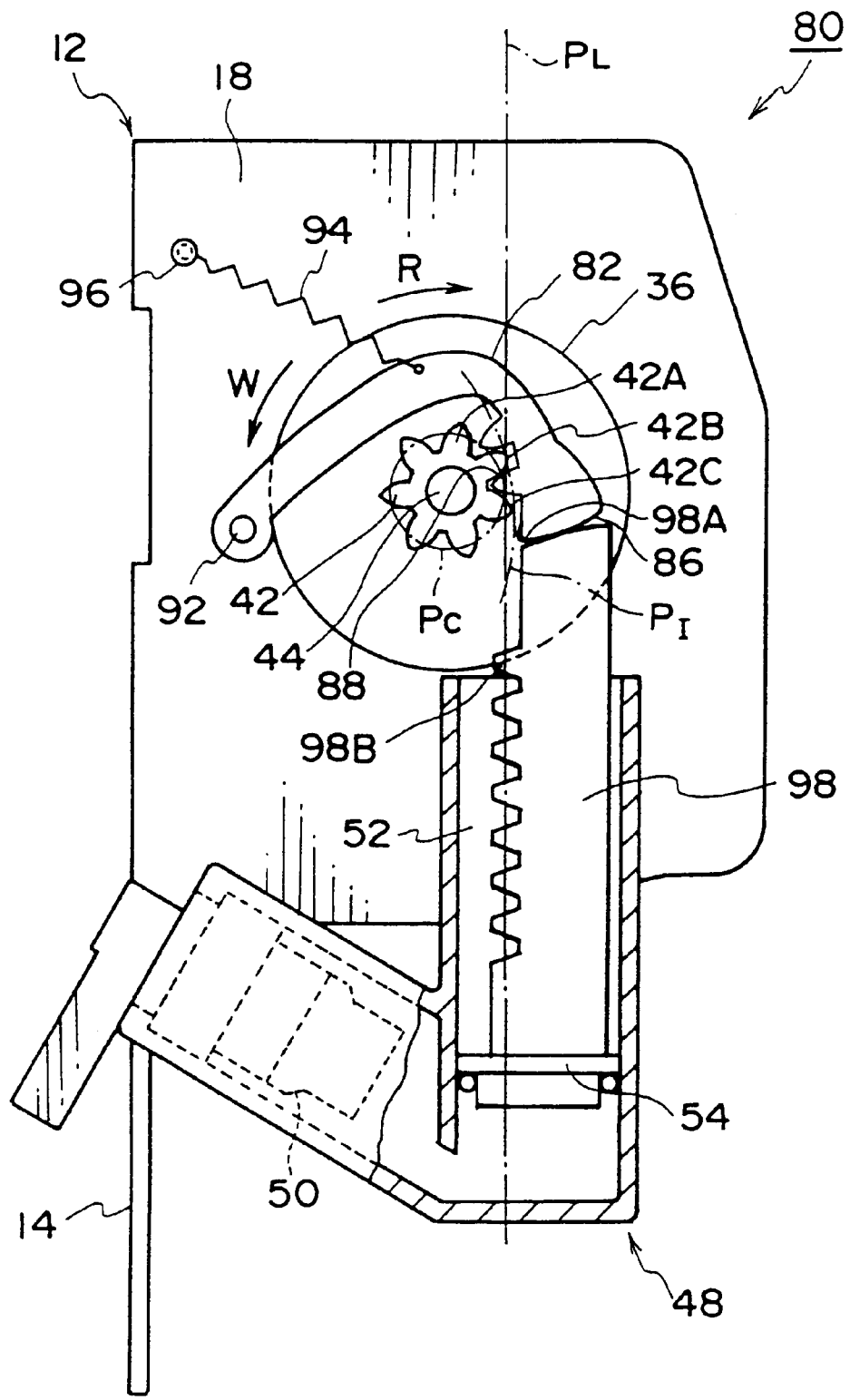
FIG. 18 is a plan view showing a state before a piston driving device of the webbing retractor according to the fifth embodiment of the present invention is actuated.
Figure 19:
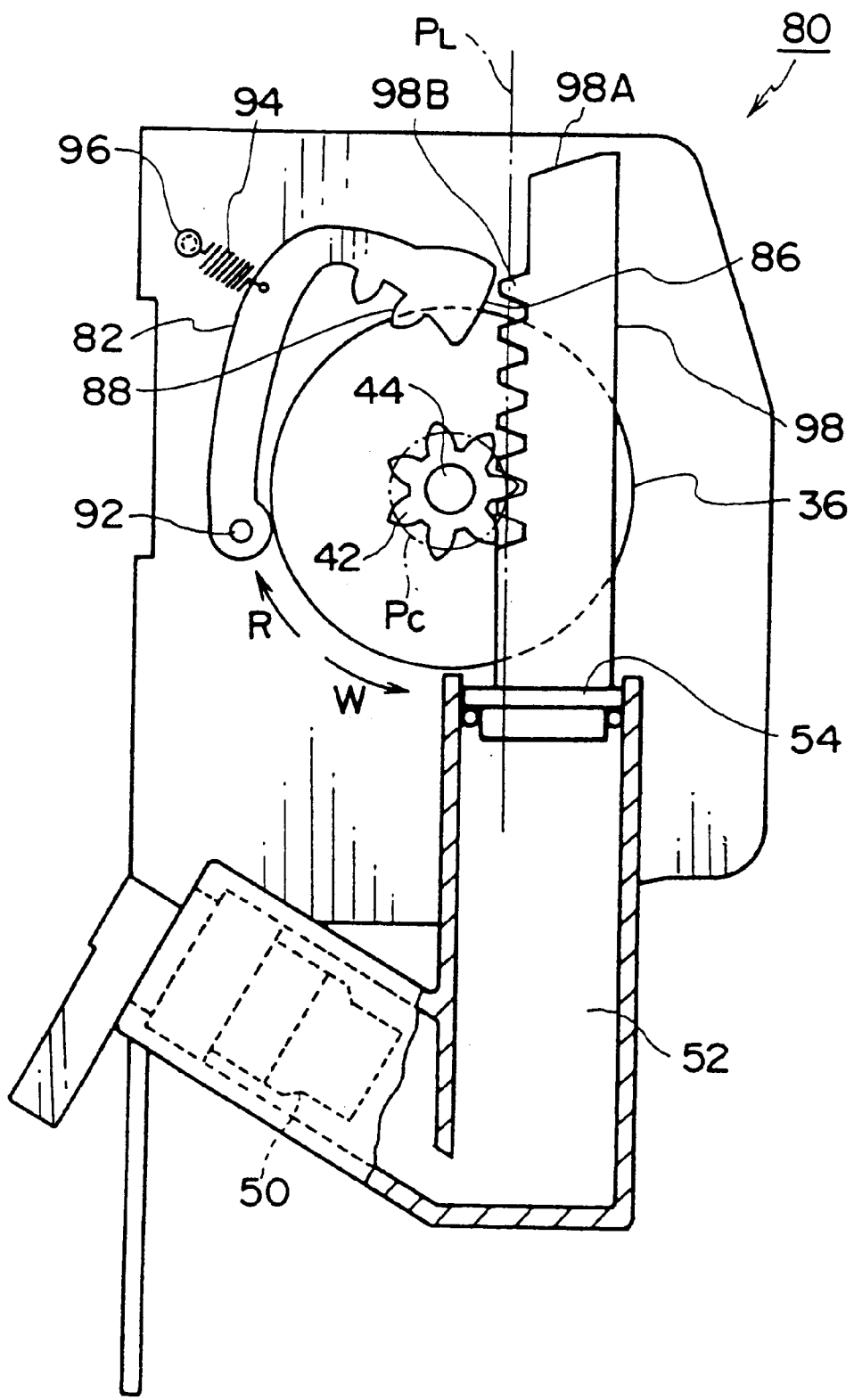
FIG. 19 is a plan view showing a state in which the piston driving device of the webbing retractor according to the fifth embodiment of the present invention completes its action.

FIGS. 17 to 19 show a webbing retractor according to a fifth embodiment of the present invention. For the webbing retractor 80 of the fifth embodiment, the same reference numerals denote basically the same components as the webbing retractor 10 of the first embodiment and a description thereof is omitted. As shown in FIG. 17, the webbing retractor 80 of the fifth embodiment contains a initial driving member 82 supported swingingly around an axis B parallel to the axis A of the pinion 42. The initial driving member 82 is curved in a substantially V shape in the length direction and the initial driving member 82 is supported with its inside side face in the length direction curved in the concave shape opposing the outer peripheral face of the pinion 42. An insertion hole 84 passing through in the axial direction S is formed in one end portion and the pressure receiving surface 86 formed in an involute curve is formed on the other end portion thereof. An inside gear 88 for meshing with the teeth 42A, 42B, 42C of the pinion 42 is formed at an end of the inside side face in the length direction curved in the concave shape as shown in FIG. 18. This internal gear 88 is constituted of two teeth having the pitch circle $P_I$ around the axis B.

On the other hand, a supporting hole 90 is formed in the side plate 18 along the axis B as shown in FIG. 17. An end portion of a supporting pin 92 passing through the insertion hole 84 of the initial driving member 82 is inserted into this supporting hole 90 and fixed therein. As a result, the initial driving member 82 is supported swingingly by the side plate 18 around the axis B. Here, the axis B is positioned so as to be out of the rotor 36 on the side plate 18 and so that the internal gear 88 of the initial driving member 82 is moved along a circle trajectory on a pitch point on the pitch circle $P_c$ and pitch line $P_L$. The initial driving member 82 is connected to an engagement pin 96 on the side plate 18 through a coil spring 94 and always urged in a swing direction in which it leaves the pinion 42.

When the webbing retractor 80 is installed on a vehicle body, the initial driving member 82 is held such that the internal gear 88 of the initial driving member 82 meshes with the teeth 42A, 42B, 42C located near a contact point between the pitch circle $P_c$ and pitch line $P_L$. At this time, the initial driving member 82 is supported such that the pitch circle $P_I$ is in contact with the pitch circle $P_c$ of the pinion 42 and the pressure receiving surface 86 of the initial driving member 82 is supported at a position substantially coinciding with an involute curve formed based on a fundamental circle of the pinion 42. On the other hand, as shown in FIG. 18, the end face 98A is formed substantially parallel to the tooth face on a side near that end face of the tooth 98B.

Next, an operation of the webbing retractor according to the fifth embodiment having such a structure will be described. In the webbing retractor 80 of the fifth embodiment, because the action of the piston driving device 48 until it starts its operation is the same as in the webbing retractor 10 of the first embodiment, a description thereof is omitted. In the webbing retractor 80, when the piston driving device 48 is actuated, the rack 98 is moved along the pitch line $P_L$ in a direction to the pinion 42 and the end face 98A presses the pressure receiving surface 86 of the initial driving member 82. As a result, the initial driving member 82 converts the initial driving force from the rack 98 to a force (rotation force) in the direction of a tangent line on the pitch circle $P_C$, of the pinion 42. The shearing pin holding the pinion 42 and the rotor 36 is sheared by this rotation force so that the pinion 42 and the rotor 36 start the rotation in the taking-up direction W. The rotor 36 starting the rotation rotates in the taking-up direction W relative to the holding plate 34 also. Consequently, the rollers 32 in the roller holding portions 36B are moved from the OFF position to the ON position in which they are nipped under a pressure between the outer peripheral face 40B of the rotary coupling portion 40 and the inside peripheral faces (edges) of the roller holding portions 36B. At the same time when the three rollers 32 are moved to the ON position, the rotor 36 is fixed to the torque transmission shaft 30 with respect to the taking-up direction W, so that the one-way clutch 28 gets into the ON state in which it is capable of transmitting a torque in the taking-up direction W to the spool 20.

When the one-way clutch 28 gets into the ON state, the initial driving member 82 receiving the initial driving force from the rack 98 rotates the spool 20 in the taking-up direction W. The spool 20 is rotated by the rotation force from the initial driving member 82 until the tooth 98B at the beginning end of the rack 98 meshes with the pinion 42. After the tooth 98B meshes with the pinion 42, the rotation thereof is continued by the pinion 42 receiving the driving force from the rack 98. In the initial driving member 82, at the same time when the tooth 98B at the beginning end of the rack 98 meshes with a tooth 42D of the pinion 42, the internal gear 88 is released from the teeth 42A, 42B, 42C of the pinion 42. As a result, the initial driving member 82 swings due to a urging force of the coil spring 94 in a direction in which it leaves the pinion 42 and then the initial driving member 82 is held at a position in which it is not in contact with the rack 98 and the pinion 42. When the action of the piston driving device 48 is terminated, the rack 98 is moved to the terminal position shown in FIG. 19 so as to rotate the spool 20 linked with the pinion 42 sufficiently in the taking-up direction W to cancel a slack of the webbing 22. However, if the slack of the webbing 22 is cancelled before the rack is moved to the terminal position, the rack is stopped before the terminal position.

In the webbing retractor 80 of the fifth embodiment described above, in addition to the effect of the webbing retractor 60 of the first embodiment, as compared to the initial driving member 62 of the second embodiment, the initial driving member 82 released from the pinion 42 is held at a position in which it is not in contact with the pinion 42 and the rack 98, the rotation of the pinion 42 can be continued by the rack 98 meshing with the teeth of the pinion 42 without being obstructed by the initial driving member 82.

Sixth Embodiment

Figure 20:
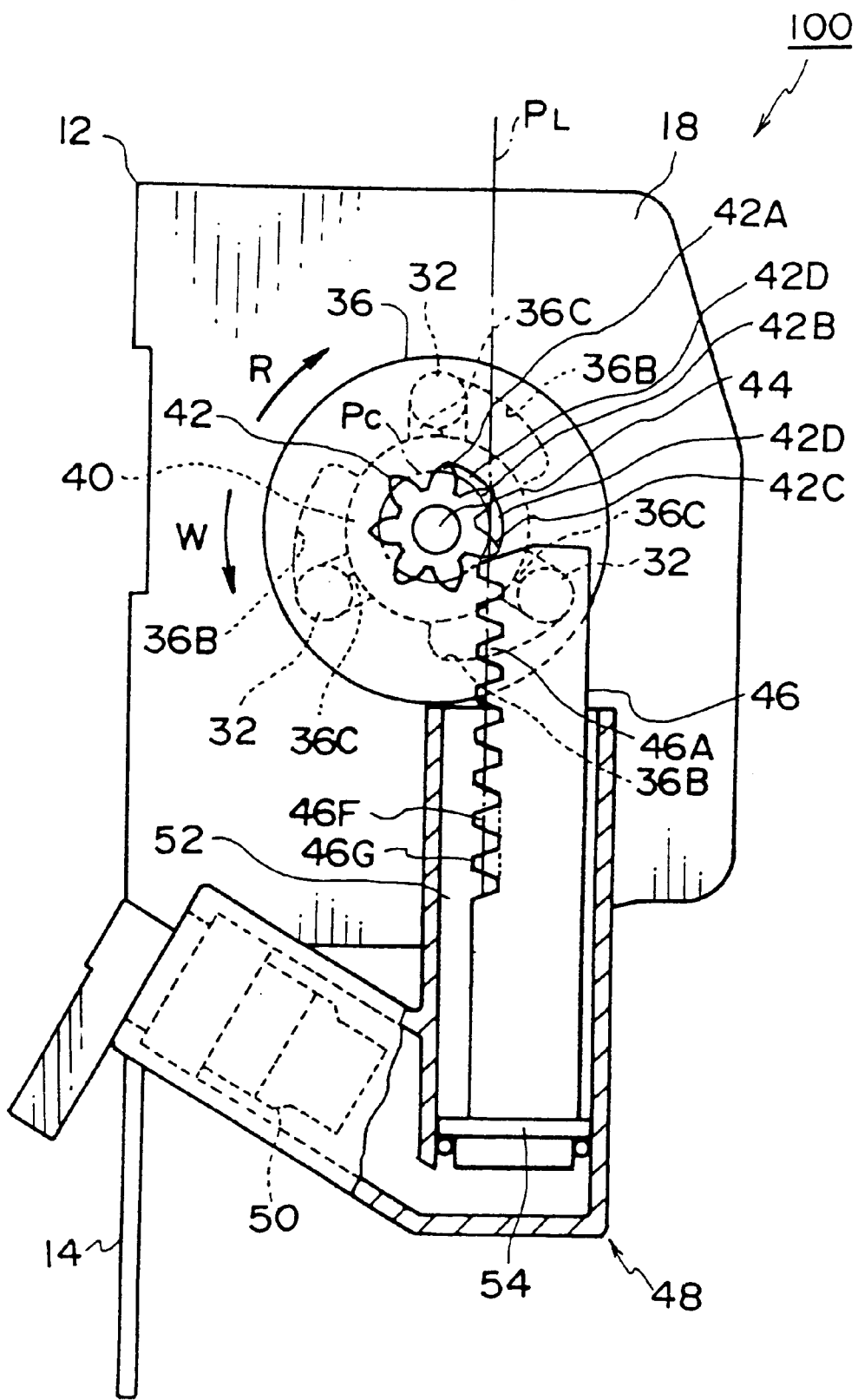
FIG. 20 is a plan view showing a state before a piston driving device of the webbing retractor according to a sixth embodiment of the present invention is actuated.

FIG. 20 shows a webbing retractor according to a sixth embodiment of the present invention. For the webbing retractor 100 of the sixth embodiment, the same reference numerals denote basically the same components as the webbing retractor 10 of the first embodiment and a description thereof is omitted. In the pinion 42, reinforcement members 42D are provided in roots (grooves) between the three teeth 42A, 42B, 42C of the pinion 42 as shown in FIG. 20. The reinforcement members 42D are fitted to the tooth faces of the teeth 42A, 42B, 42C within those roots without gaps and formed integrally with the teeth 42A, 42B, 42C. Each reinforcement member 42D is formed thinner than the tooth width of the pinion 42 and in contact with the outside side face of the rotor 36 with respect to the axis direction S. On the other hand, in the rack 46, the tooth width of two teeth 46F, 46G corresponding to the reinforcement members 42 is formed thinner than those of the other teeth. These teeth 46F, 46G have recesses which are formed on the side facing the rotor 36 in the axial direction S corresponding to the reinforcement members 42D. The recesses prevent the reinforcement members 42D from contacting the tooth face of the rack 46 after the pinion 42 is rotated by a turn. When the rack 46 is in a stand by position as shown in FIG. 20, it is held at a position in which the tooth face at the front end thereof is in contact with a tooth 42C of the pinion 42.

An operation of the webbing retractor of the sixth embodiment having such a structure will be described. In the webbing retractor 100 of the sixth embodiment, when an emergent deceleration detecting sensor detects an emergent deceleration of a vehicle due to a collision or the like, the gas generator 50 supplies a high pressure gas into the piston cylinder 52. As a result, the piston 54 moves the rack 46. When the rack 46 is moved along the pitch line $P_L$ in a direction to the pinion 42, the rack 46 meshes with the pinion 42 and rotates the pinion 42 and the rotor 36 in the taking-up direction W. An action from a rotation start of the pinion 42 to a stop of the rack 46 is the same as in the webbing retractor 10 of the first embodiment, a description thereof is omitted.

In the webbing retractor 100 of the sixth embodiment described above, because the teeth 42B, 42C of the pinion 42 receiving the initial driving force from the rack 46 are reinforced by the reinforcement members 42D, the initial driving force which the teeth 42B, 42C are capable of bearing can be increased. Thus, even when the initial driving force from the rack 46 is large, the pinion 42 can be prevented from being damaged. Consequently, without changing the material and the like of the pinion 42, the pitch circle of the pinion 42 can be reduced so as to reduce the length of the rack 46 and traveling range of the rack 46 by the piston driving device 48. Therefore, the size of the webbing retractor 100 can be reduced.

Seventh Embodiment

Figure 21:
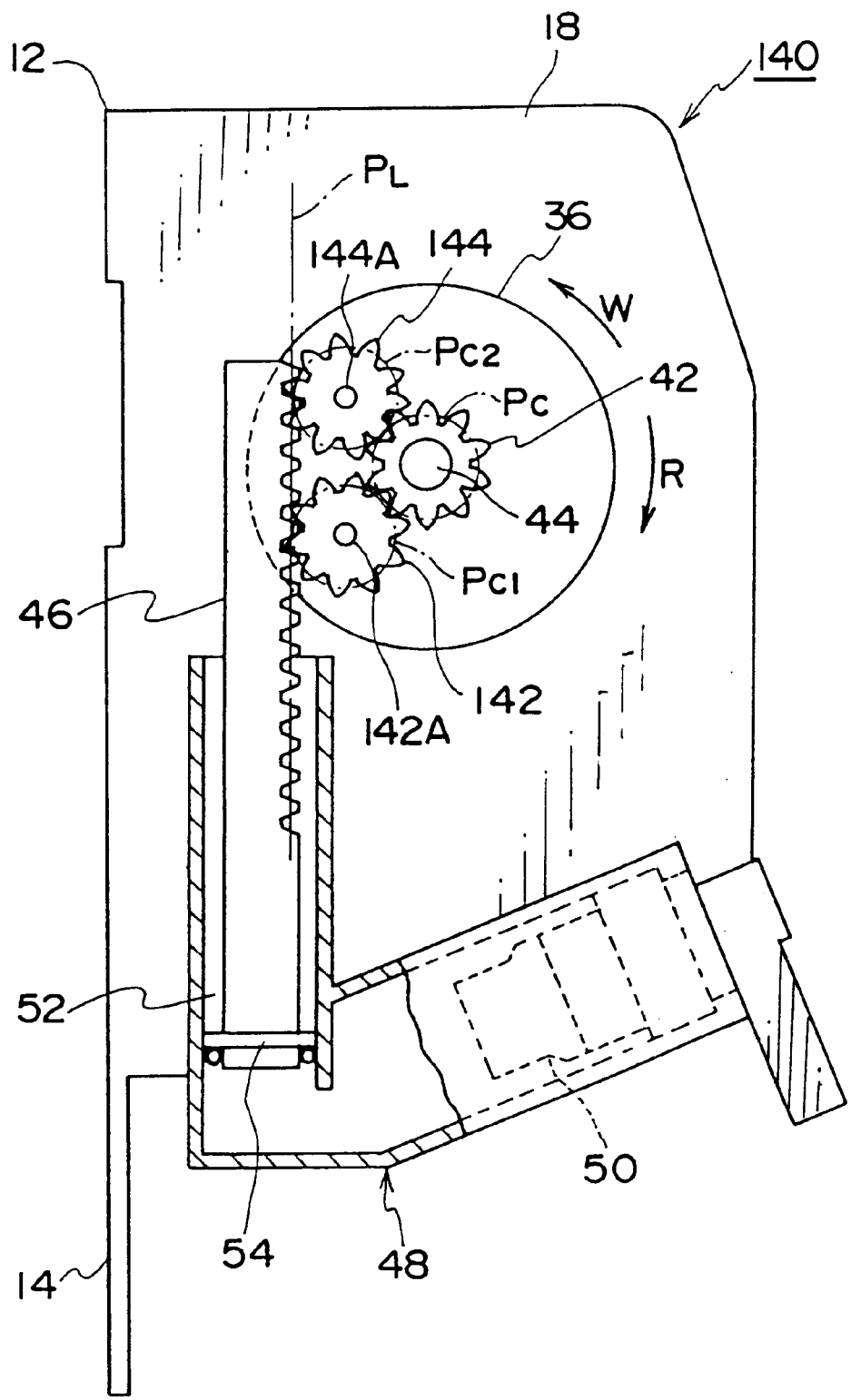
FIG. 21 is a plan view showing a state before a piston driving device of the webbing retractor according to a seventh embodiment of the present invention is actuated.
Figure 22:
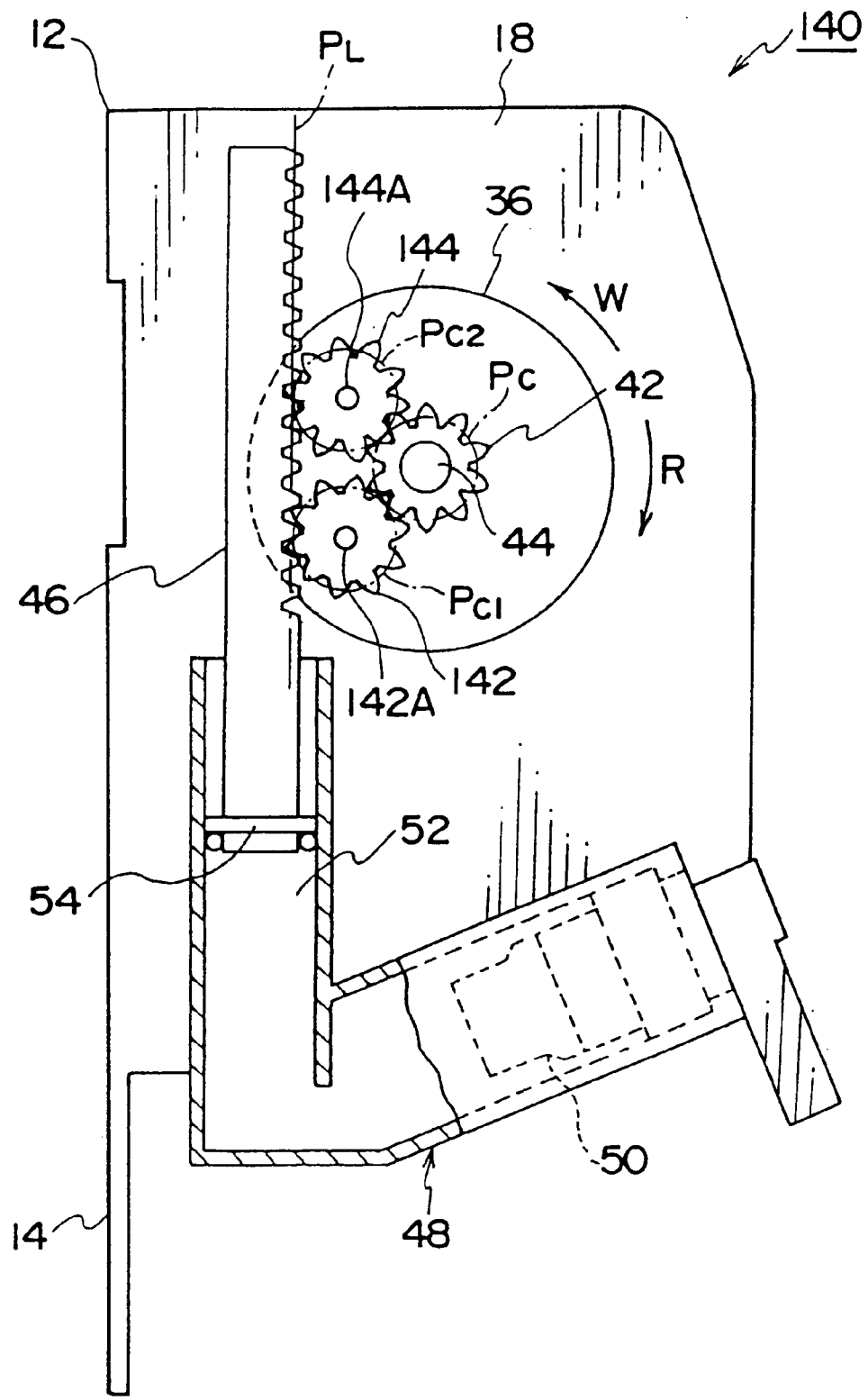
FIG. 22 is a plan view showing a state in which the piston driving device of the webbing retractor according to an eighth embodiment of the present invention completes its action.

FIGS. 21 and 22 show a webbing retractor according to a seventh embodiment of the present invention. For the webbing retractor 140 of the seventh embodiment, the same reference numerals denote basically the same components as the webbing retractor of the first embodiment and a description thereof is omitted. As shown in FIG. 21, a pair of intermediate gears 142, 144 mesh with the pinion 42. The intermediate gears 142, 144 have the same quantity of teeth as the pinion 42 and they are disposed so as to mesh with different teeth of the pinion 42. Supporting shafts 142A, 144A are projected from one end face of the intermediate gears 142, 144 in the axial direction so as to go along the axes of the gears 142, 144. These supporting shafts 142A, 144A are supported rotatably by a cover member (not shown) for covering the one-way clutch 28 and the pinion 42 disposed on the side plate 18. As a result, the intermediate gears 142, 144 can be rotated in a condition that they mesh with the pinion 42 without being interfered by the rotor 36 containing the one-way clutch 28.

On the other hand, as shown in FIG. 21, the rack 46 is disposed at a position in which the pitch line $P_L$ contacts both the pitch circle $P_{c1}$ of the intermediate gear 142 and pitch circle $P_{c2}$ of the intermediate gear 144. At a standby position before the piston driving device 48 is actuated, different teeth on the front side thereof mesh with the intermediate gear 142 and the intermediate gear 144.

Next, an operation of the webbing retractor of the seventh embodiment having such a structure will be described. In the webbing retractor of the seventh embodiment, because an action until the piston driving device 48 starts its operation is the same as the webbing retractor of the first embodiment, a description thereof is omitted. In the webbing retractor 140, after the piston driving device 48 is actuated, the rack is moved along the pitch line $P_L$, so that the intermediate gears 142, 144 meshing with the rack 46 are rotated in an opposite direction (clockwise direction in FIGS. 21 and 22) to the taking-up direction W. As a result, the pinion 42 meshing with these intermediate gears 142, 144 is rotated in the taking-up direction W. In the webbing retractor 140 of the seventh embodiment, because the rotation direction of the pinion 42 is inverted with respect to the rotation directions of the intermediate gears 142, 144 by the intermediate gears 142, 144, the rack 42 meshes with the pinion 42 from an opposite side to the webbing retractor 10 of the first embodiment.

At the same time when the pinion 42 and the rotor 36 start to rotate in the taking-up direction W, the shearing pin (not shown) holding the pinion 42 and the rotor 36 at the initial position is sheared so that the pinion 42 and the rotor 36 start to rotate in the taking-up direction W. As a result, the one-way clutch 28 (see FIG. 1) gets into the ON state, the spool 20 rotates integrally with the pinion 42 and the rotor 36 in the taking-up direction W. When an action of the piston driving device 48 is terminated, the rack is moved up to the terminal position shown in FIG. 22 so as to rotate the spool 20 connected to the pinion 42 sufficiently in the taking-up direction W to cancel a slack of the webbing 22. However, if the slack of the webbing 20 is cancelled before the rack 46 reaches the terminal position, it is stopped before the terminal position.

In the webbing retractor 140 according to the seventh embodiment described above, at the same time when the rack 46 in the down state starts to travel along the pitch line $P_L$, the driving force from the rack 46 is distributed by the pair of the intermediate gears 142, 144 and transmitted to the pinion 42. Thus, as compared to a case in which the intermediate gears 142, 144 are not employed like the webbing retractor 10 of the first embodiment, the maximum load applied to a tooth of the pinion 42 can be reduced to substantially half. Therefore, generally even when the initial driving force from the rack 46 is large just after the piston driving device 48 starts to operate, applying the largest load on the pinion 42, it is possible to prevent the teeth of the pinion 42 from being damaged by the initial driving force. As a result, by reducing the size of the pitch circle of the pinion 42 without changing the material or the like of the pinion 42, the length of the rack 46 and the traveling range of the rack 46 by the piston driving device 48 can be reduced, thereby the size of the webbing retractor 140 being reduced.

Eighth Embodiment

Figure 23:
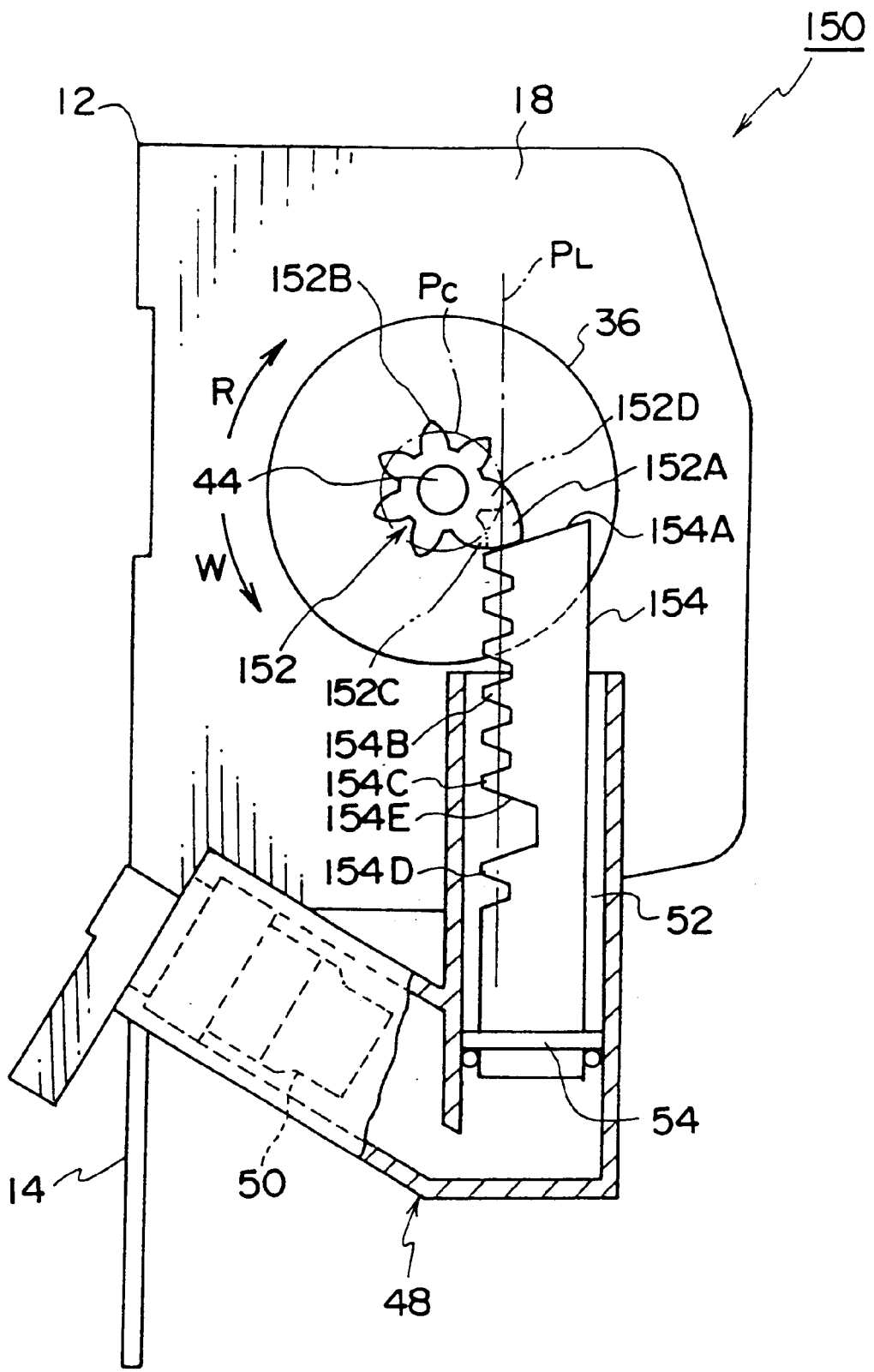
FIG. 23 is a plan view showing a state before a piston driving device of the webbing retractor according to the eighth embodiment of the present invention is actuated.
Figure 24:
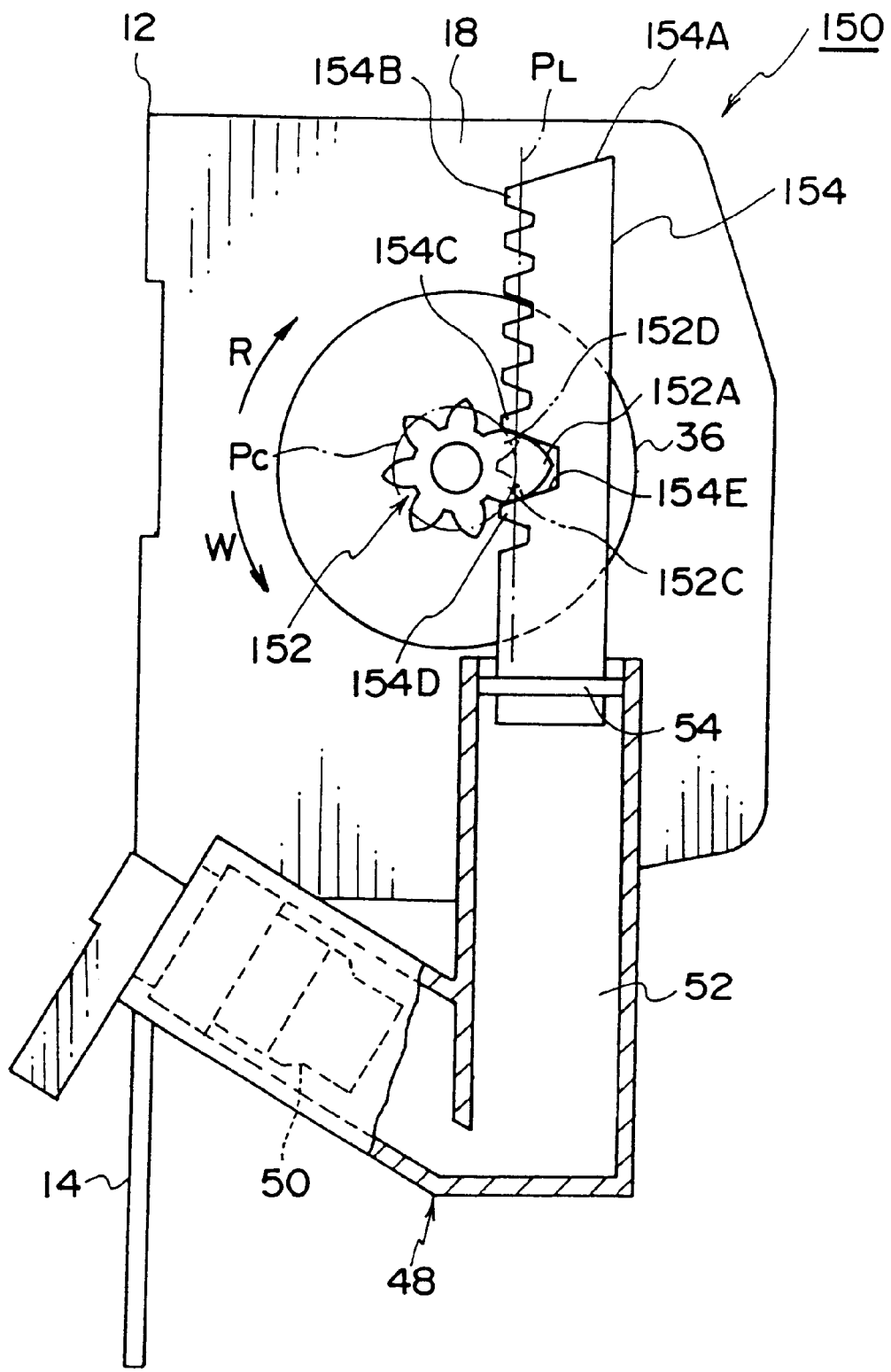
FIG. 24 is a plan view showing a state in which the piston driving device of the webbing retractor according to the seventh embodiment of the present invention completes its action.

FIGS. 23 and 24 shows a webbing retractor according to an eighth embodiment of the present invention. For the webbing retractor 150 of the eighth embodiment, the same reference numerals denote basically the same components as the webbing retractor 10 of the first embodiment and a description thereof is omitted. The webbing retractor 150 has a pinion 152 connected to the spool 20 coaxially through the one-way clutch 28 (see FIG. 1), as shown in FIG. 23. One of six teeth formed on the pinion 152 is a beginning end tooth 152A for receiving the initial driving force. The module value (JIS B1701) of this beginning end tooth 152A, the module value defining a size of the tooth corresponding to the diameter of the pitch circle $P_c$, is twice the module value of the other teeth 152B. Because the pitch circle $P_c$ of all the teeth 152A, 152B is common, the beginning end tooth 152A has a pair of tooth faces including outside tooth faces of two teeth (teeth 152C, 152D indicated by two-dots and dash line in FIGS. 23 and 24) adjacent each other and involute curves extended from ends of the tooth faces, having the same shape as the other teeth 152B.

On the other hand, on a front end surface of the rack 154 is formed a front end tooth face 154A substantially parallel to a tooth face on a side near that front end of the tooth 154B. A tooth root 154E between a pair of teeth 154C and 154D which will mesh with the beginning end tooth 152A after the rack 154 starts to move is formed in a shape capable of meshing with the beginning end tooth 152A, namely such that a depth of the tooth root 154E and root width are larger than the other tooth roots, corresponding to the beginning end tooth 152A. At a standby position in which the piston driving device 48 is actuated, as shown in FIG. 23, the front end face 154 of the rack 154 is in contact with the beginning end tooth 152A.

Next, an operation of the webbing retractor according to the eighth embodiment having such a structure will be described. In the webbing retractor 150 of the eighth embodiment, because the action of the piston driving device 48 until it starts its operation is the same as in the webbing retractor 10 of the first embodiment, a description thereof is omitted. In the webbing retractor 150, when the piston driving device 48 is actuated so that the rack 46 is moved along the pitch line $P_L$, the front end tooth face 154A of the rack 154 presses the beginning end tooth 152A with the initial driving force. As a result, the pinion 152 and the rotor 36 are rotated in the taking-up direction W.

At the same time when the pinion 152 and the rotor 36 start to rotate in the taking-up direction W, the shearing pin (not shown) holding the pinion 42 and the rotor 36 at the initial position is sheared so that the pinion 152 and the rotor 36 start to rotate in the taking-up direction W. As a result, the one-way clutch 28 gets into the ON state, the spool 20 rotates integrally with the pinion 42 and the rotor 36 in the taking-up direction W.

When the rack 154 is further moved along the pitch line $P_L$, the tooth 154B of the rack 154 meshes with the tooth 152B of the pinion 152 so that the rotations of the pinion 152, the rotor 36 and the spool 20 in the taking-up direction W are continued. When the pinion 152 is rotated by a turn, as shown in FIG. 24, the beginning end tooth 152A meshes with the tooth root 154E between the teeth 154C and 154D and just after this, the action of the piston driving device 48 is terminated. As a result, the spool 20 linked with the pinion 142 is rotated sufficiently in the taking-up direction to cancel a slack of the webbing 22. However, if the slack of the webbing 22 is cancelled before the rack 46 reaches the terminal position, the rack 46 is stopped before the terminal position.

In the webbing retractor 150 of the eighth embodiment described above, because the module value of the beginning end tooth 152A is twice those of the other teeth, the tooth width of the beginning end tooth 152A along the pitch circle $P_c$ is thicker than the tooth width of the other teeth 152B. Thus, the strength of the beginning end tooth 152A can be intensified relative to the other teeth 152B. As a result, even when the initial driving force from the rack 154 is large, it is possible to prevent the pinion 152 from being damaged by the initial driving force. Therefore, by reducing the pitch circle of the pinion 142 without changing the material or the like of the pinion 142, the length of the rack 46 and the traveling range of the rack 46 by the piston driving device 48 can be reduced and therefore the size of the webbing retractor 150 can be also reduced.

Although in the webbing retractor 150 of the eighth embodiment, the module value of the beginning end tooth 152A of the pinion 152 is twice those of the other teeth 152B, this value can be changed, this value may be twice or a larger integer times depending on the size of the other teeth 152B, a strength of the beginning end tooth 152A necessary for bearing the initial driving force or the like.

Ninth Embodiment

Figure 25:
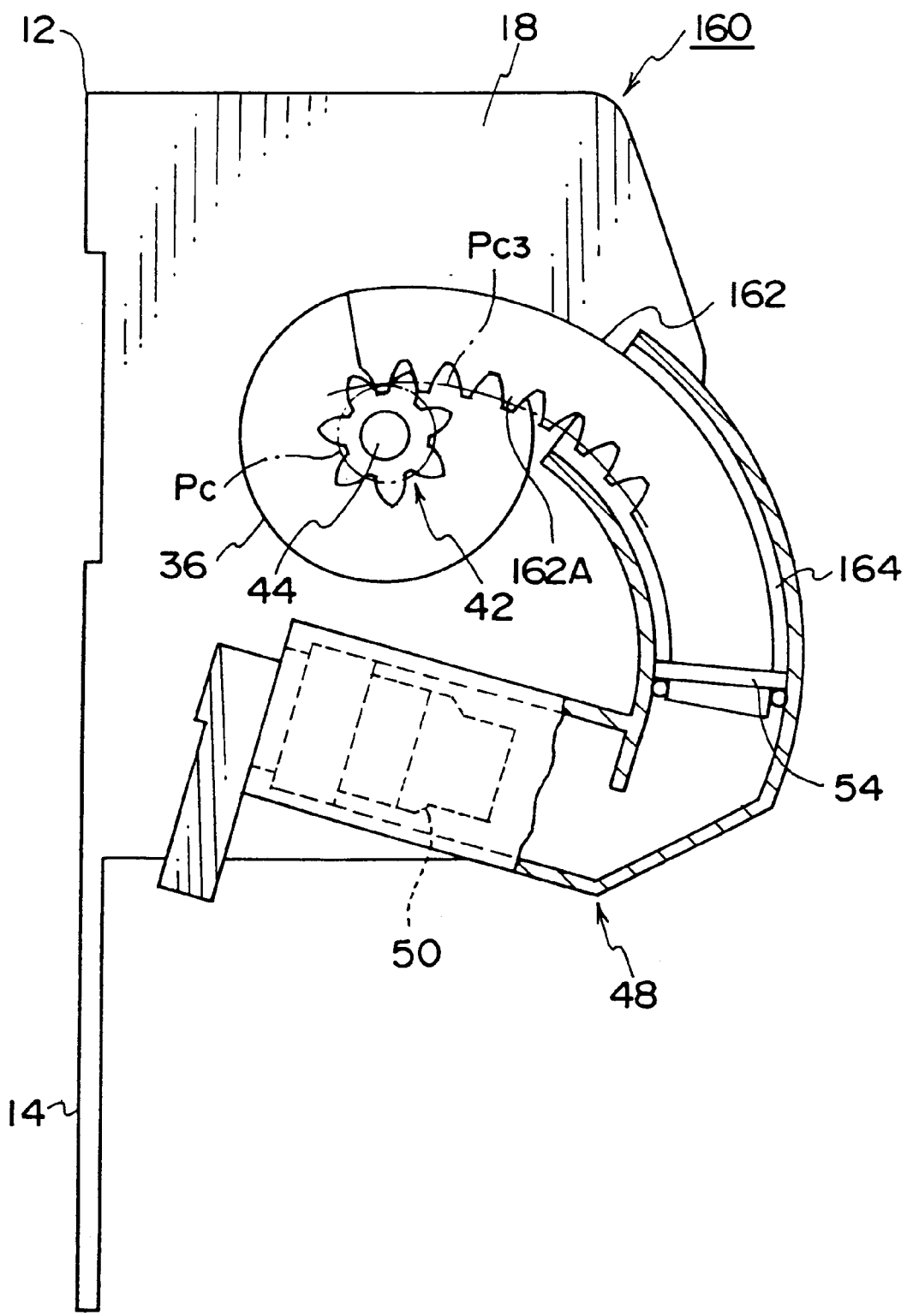
FIG. 25 is a plan view showing a state before a piston driving device of the webbing retractor according to a ninth embodiment of the present invention is actuated.
Figure 26:
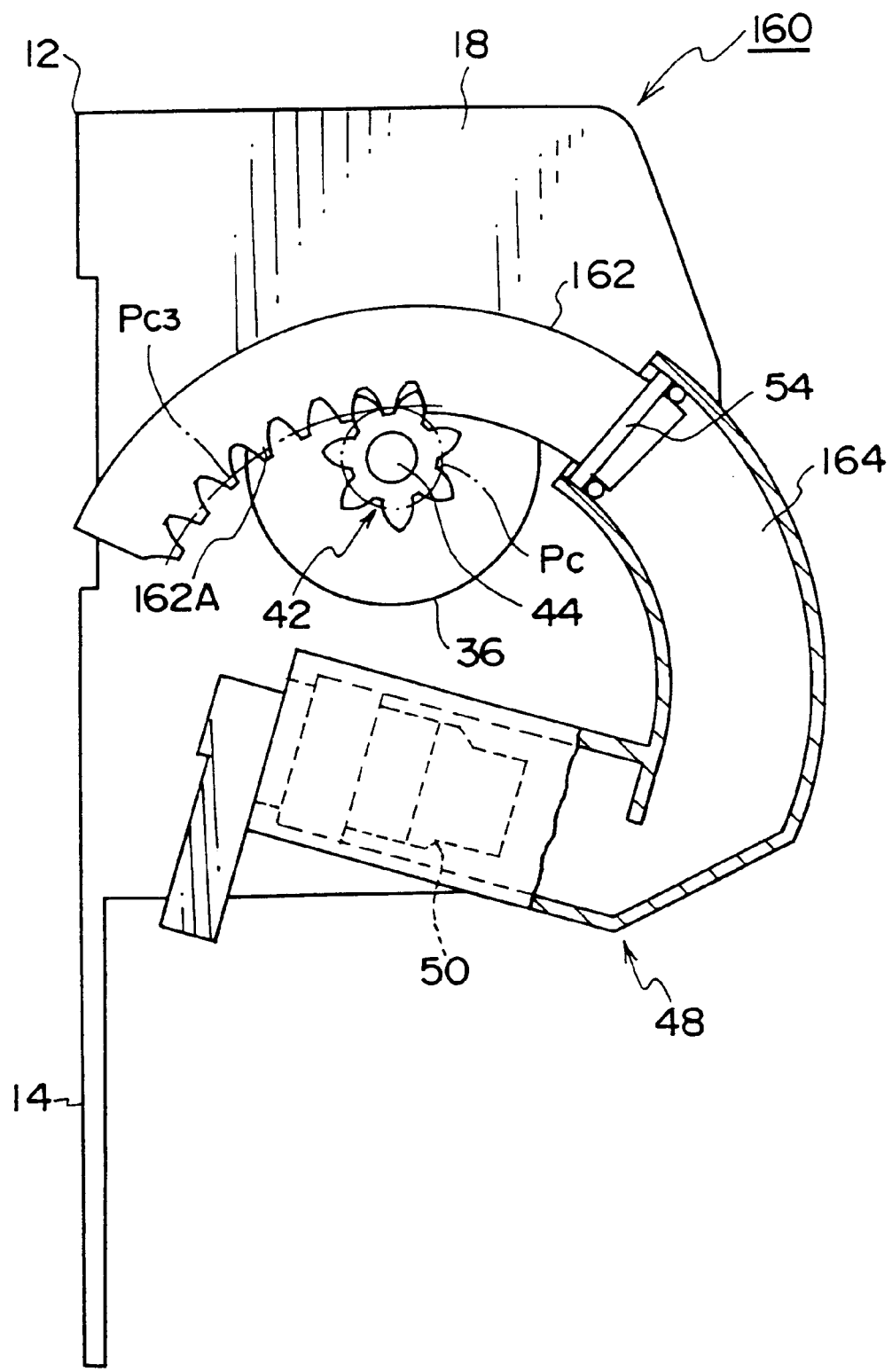
FIG. 26 is a plan view showing a state in which the piston driving device of the webbing retractor according to the ninth embodiment of the present invention completes its action.

FIGS. 25 and 26 show a webbing retractor according to a ninth embodiment of the present invention. For the webbing retractor 160 of the ninth embodiment, the same reference numerals denote basically the same components as the webbing retractor 10 of the first embodiment and a description thereof is omitted. The pinion 42 is linked with the spool 20 through the one-way clutch 28 (see FIG. 1) contained in the rotor 36 like the first embodiment. As shown in FIG. 25, a fan-shaped internal tooth gear 162 meshes with this pinion 42. Internal teeth 162A are formed on an inside peripheral face facing the teeth of the pinion 42, of the internal tooth gear 162. The internal teeth 162A employ a circle trajectory larger than the pitch circle $P_c$ of the pinion 42 as a pitch circle $P_{c3}$ and they are formed continuously along this pitch circle $P_{c3}$. Here, the internal tooth gear 162 is supported by the piston driving device 48 such that the pitch circle $P_{c3}$ contacts the pitch circle $P_c$ of the pinion 42. The curvature radius of the pitch circle $P_{c3}$ is so determined that contact ratio between the internal teeth 162A of the internal tooth gear 162 and teeth of the pinion 42 is about 2.

On the other hand, the piston cylinder 164 of the piston driving device 48 is also curved along the pitch circle $P_{c3}$ shown in FIG. 25. Thus, when the piston driving device 48 is actuated, the internal gear 162 is moved along the pitch circle $P_{c3}$ from the waiting position shown in FIG. 25 to the terminal position shown in FIG. 26.

Next, an operation of the webbing retractor according to the ninth embodiment having such a structure will be described. In the webbing retractor 160 of the ninth embodiment, because the action of the piston driving device 48 until it starts its operation is the same as in the webbing retractor 10 of the first embodiment, a description thereof is omitted. In the webbing retractor 160, when the piston driving device 48 is actuated, so that the internal tooth gear 162 is moved along the pitch circle $P_{C3}$, the internal tooth gear 162 and the pinion 42 are rotated in the taking-up direction W. At the same time when the pinion 42 and the rotor 36 start to rotate in the taking-up direction W, the shearing pin (not shown) holding the pinion 42 and the rotor 36 at the initial position is sheared, so that the pinion 42 and the rotor 36 start to rotate in the taking-up direction W. As a result, the one-way clutch 28 (see FIG. 1) gets into the ON state, so that the spool 20 is rotated integrally with the pinion 42 and the rotor 36 in the taking-up direction W. When an action of the piston driving device 48 is terminated, the internal tooth gear 162 is moved up to the terminal position shown in FIG. 26 so as to rotate the spool 20 sufficiently in the taking-up direction W to remove a slack of the webbing 22. However, when the slack of the webbing is removed before the internal tooth gear 162 reaches the terminal position, the internal tooth gear 162 is stopped before the terminal position.

In the webbing retractor 160 of the ninth embodiment described above, at the same time when the internal tooth gear 162 in the down state starts to move along the pitch line $P_L$, the driving force from the internal tooth gear 162 is distributed to two or more teeth of the pinion 42 and transmitted to the pinion 42. Therefore, as compared to a case in which the contact ratio between the pinion 42 and the rack 46 is about 1 like the webbing retractor 10 of the first embodiment, the maximum load applied to a single tooth of the pinion 42 can be reduced to substantially half. Therefore, generally even when the initial driving force from the rack 46 is large just after the piston driving device 48 starts to operate, applying the largest load on the pinion 42, it is possible to prevent the teeth of the pinion 42 from being damaged by the initial driving force. As a result, by reducing the size of the pitch circle of the pinion 42 without changing the material or the like of the pinion 42, the traveling range of the internal tooth gear 162 by the piston driving device 48 can be reduced and the internal tooth gear 162 moves along the pitch circle $P_{C3}$ which is a circle trajectory. Thus, the size of the webbing retractor 160 can be reduced.

Although in the webbing retractor 160 of the ninth embodiment, the contact ratio between the internal tooth gear 162 and pinion 42 is set to about 2, this value can be changed this value may be increased by reducing the curvature radius of the pitch circle $PC_3$. Thus, the contact ratio may be increased over 2 depending on a magnitude of the initial driving force or the like.

According to the gear mechanism of the present invention, as described above, even when a large initial driving force is applied from the gear to the pinion, the pinion is prevented from being damaged. Further, according to the webbing retractor of the present invention, the size of the pinion can be reduced without changing the material or the like, so that the size of the device can be reduced without inducing increases in costs and weight.

What is claimed is:

1. A gear mechanism comprising:
   a pinion having gear teeth;
   a gear member having teeth meshable with said teeth of said pinion; and
   an initial driving member provided on said pinion for receiving an initial driving force from said gear member to rotate the pinion prior to a meshing between the teeth of said pinion and gear member.

2. A gear mechanism according to claim 1, wherein said initial driving member is provided on said pinion coaxially therewith.

3. A gear mechanism according to claim 2, wherein said initial driving member has a pressure receiving portion for receiving said initial driving force formed in an involute curve.

4. A gear mechanism according to claim 2, wherein said gear includes a recess for avoiding an interference with said initial driving member which rotates said pinion by receiving said initial driving force.

5. A gear mechanism according to claim 2, wherein said initial driving member is fitted between teeth of said pinion detachably.

6. A gear mechanism according to claim 5 further comprising a guide portion for allowing said initial driving member to rotate integrally with said pinion when said initial driving member meshes with said pinion to transmit said initial driving force to said pinion and for limiting a moving direction of said initial driving member such that said initial driving member is released from said pinion after the transmission of the initial driving force is completed.

7. A gear mechanism according to claim 1, wherein said initial driving member is supported swingingly around an axis different from that of said pinion and is fitted between teeth of said pinion detachably.

8. A gear mechanism according to claim 1, wherein said initial driving member supports a pressure receiving portion for receiving said initial driving force outward in a radial direction relative to said pinion.

9. A gear mechanism according to claim 1, wherein said initial driving member is provided on said pinion so as to rotate integrally with said pinion while having an engagement portion outside a pitch circle of said pinion, and said gear comprises a driving force transmitting member engaging with said engagement portion to transmit an initial driving force to said initial driving member, said driving force transmitting member being released from said engagement portion after the transmission of said initial driving force is completed.

10. A gear mechanism according to claim 1, wherein said gear comprises a rack supported movably in the direction of a pitch line of said pinion.

11. A gear mechanism comprising:
    a pinion having gear teeth;
    a gear member having teeth meshable with the teeth of said pinion; and
    an initial driving member provided on said gear mechanism for receiving an initial driving force from said gear member to rotate said pinion prior to a meshing between the teeth of said pinion and the teeth of said gear member.

12. A gear mechanism according to claim 11, wherein said initial driving member comprises a teeth portion meshable with the teeth of said pinion, one end portion of said initial driving member being supported swingingly around an axis which is offset and parallel to an axis of said pinion, the teeth portion being provided on another end portion of said initial driving member.

13. A gear mechanism according to claim 11, wherein said initial driving member includes a pressure receiving portion for receiving said initial driving force from said gear member, said gear member further including a driving force transferring portion for transferring said initial driving force to said initial driving member by pushing the pressure receiving portion.

14. A gear mechanism according to claim 11, wherein said initial driving member includes a pressure receiving portion for receiving said initial driving force from said gear member, and a driving force transferring member for transferring said initial driving force from said -ear member to said initial driving member, said driving force transferring member being provided at said gear member.

* * * * *